United States Patent
Purkayastha et al.

(10) Patent No.: US 12,101,848 B2
(45) Date of Patent: Sep. 24, 2024

(54) SUBSCRIPTION FOR NON-DATA WIRELESS SERVICES

(71) Applicant: QUALCOMM Incorporated, San Diego, CA (US)

(72) Inventors: Punyaslok Purkayastha, San Diego, CA (US); Gavin Bernard Horn, La Jolla, CA (US)

(73) Assignee: QUALCOMM Incorporated, San Diego, CA (US)

( * ) Notice: Subject to any disclaimer, the term of this patent is extended or adjusted under 35 U.S.C. 154(b) by 319 days.

(21) Appl. No.: 17/645,283

(22) Filed: Dec. 20, 2021

(65) Prior Publication Data
US 2023/0199473 A1    Jun. 22, 2023

(51) Int. Cl.
*H04W 8/18*    (2009.01)
*H04W 60/04*    (2009.01)
*H04W 72/23*    (2023.01)

(52) U.S. Cl.
CPC .............. *H04W 8/18* (2013.01); *H04W 60/04* (2013.01); *H04W 72/23* (2023.01)

(58) Field of Classification Search
CPC ....... H04W 60/04; H04W 8/18; H04W 24/08; H04W 4/20; H04W 4/30; H04W 72/23; G06Q 10/063; G06Q 50/32
USPC ...................................................... 455/435.1
See application file for complete search history.

(56) References Cited

U.S. PATENT DOCUMENTS

| | | | |
|---|---|---|---|
| 2019/0190775 A1* | 6/2019 | Buckley | H04W 8/02 |
| 2021/0067382 A1 | 3/2021 | Manolakos et al. | |
| 2021/0250828 A1* | 8/2021 | Vaidya | H04W 24/08 |
| 2022/0182951 A1* | 6/2022 | Zhou | H04W 24/10 |
| 2022/0394477 A1* | 12/2022 | Tsiatsis | H04W 24/08 |
| 2023/0079891 A1* | 3/2023 | Shreevastav | G01S 5/10 |
| | | | 342/458 |

FOREIGN PATENT DOCUMENTS

| | | |
|---|---|---|
| WO | WO-2021173052 A1 | 9/2021 |
| WO | WO-2022212973 | 10/2022 |
| WO | WO-2023038434 A1 * | 3/2023 |

OTHER PUBLICATIONS

International Search Report and Written Opinion—PCT/US2022/079635—ISA/EPO—Mar. 2, 2023.

(Continued)

*Primary Examiner* — Hirdepal Singh
(74) *Attorney, Agent, or Firm* — Harrity & Harrity, LLP

(57) ABSTRACT

Various aspects of the present disclosure generally relate to wireless communication. In some aspects, a management network node may receive, from a communication network node, a service activation request for a non-data wireless service (NDWS). The management network node may transmit, to a verification network node, a request associated with providing an NDWS configuration for the communication network node. The management network node may receive, from the verification network node, a configuration indication associated with the management network node providing the NDWS configuration for the communication network node. Numerous other aspects are described.

30 Claims, 9 Drawing Sheets

(56) References Cited

OTHER PUBLICATIONS

Nokia et al., "Positioning Access Type Selection", 3GPP TSG-SA WG2 Meeting #131, S2-1901656 (revision of S2-190xxxx), 3rd Generation Partnership Project, Mobile Competence Centre, 650, Route Des Lucioles, F-06921 Sophia-Antipolis Cedex, France, vol. SA WG2, No. Tenerife, Spain, Feb. 25, 2019-Mar. 1, 2019, 6 Pages, Feb. 19, 2019, XP051610258.

Nokia., et al., "Pre-Configuration and Initiation of On-Demand PRS Associated With Qos/Radio Conditions", 3GPP TSG-RAN WG2 Meeting #114 Electronic, R2-2106355, 3rd Generation Partnership Project, Mobile Competence Centre, 650, Route Des Lucioles, F-06921 Sophia-Antipolis Cedex, France, vol. RAN WG2, No. Elbonia, May 19, 2021-May 27, 2021, May 11, 2021, XP052007709, p. 3, lines 1-16, figure 1, 4 Pages.

Nokia et al., "Update to 5GC-MO-LR Procedure for the Case Location Estimate of the UE to Be sent to an LCS Client or AF", 3GPP SA WG2 Meeting, S2-1911815 (revision of S2-19xxxx), 3rd Generation Partnership Project, Mobile Competence Centre, 650, Route Des Lucioles, F-06921 Sophia-Antipolis Cedex, France, vol. SA WG2, No. Reno, Nevada, USA, Nov. 18, 2019-Nov. 22, 2019, 11 Pages, Nov. 8, 2019, XP051821890.

* cited by examiner

SUBSCRIPTION FOR NON-DATA WIRELESS SERVICES

FIELD OF THE DISCLOSURE

Aspects of the present disclosure generally relate to wireless communication and to techniques and apparatuses for a subscription for a non-data wireless service.

BACKGROUND

Wireless communication systems are widely deployed to provide various telecommunication services such as telephony, video, data, messaging, and broadcasts. Typical wireless communication systems may employ multiple-access technologies capable of supporting communication with multiple users by sharing available system resources (e.g., bandwidth, transmit power, or the like). Examples of such multiple-access technologies include code division multiple access (CDMA) systems, time division multiple access (TDMA) systems, frequency division multiple access (FDMA) systems, orthogonal frequency division multiple access (OFDMA) systems, single-carrier frequency division multiple access (SC-FDMA) systems, time division synchronous code division multiple access (TD-SCDMA) systems, and Long Term Evolution (LTE). LTE/LTE-Advanced is a set of enhancements to the Universal Mobile Telecommunications System (UMTS) mobile standard promulgated by the Third Generation Partnership Project (3GPP).

A wireless network may include one or more base stations that support communication for a user equipment (UE) or multiple UEs. A UE may communicate with a base station via downlink communications and uplink communications. "Downlink" (or "DL") refers to a communication link from the base station to the UE, and "uplink" (or "UL") refers to a communication link from the UE to the base station.

The above multiple access technologies have been adopted in various telecommunication standards to provide a common protocol that enables different UEs to communicate on a municipal, national, regional, and/or global level. New Radio (NR), which may be referred to as 5G, is a set of enhancements to the LTE mobile standard promulgated by the 3GPP. NR is designed to better support mobile broadband internet access by improving spectral efficiency, lowering costs, improving services, making use of new spectrum, and better integrating with other open standards using orthogonal frequency division multiplexing (OFDM) with a cyclic prefix (CP) (CP-OFDM) on the downlink, using CP-OFDM and/or single-carrier frequency division multiplexing (SC-FDM) (also known as discrete Fourier transform spread OFDM (DFT-s-OFDM)) on the uplink, as well as supporting beamforming, multiple-input multiple-output (MIMO) antenna technology, and carrier aggregation. As the demand for mobile broadband access continues to increase, further improvements in LTE, NR, and other radio access technologies remain useful.

SUMMARY

Some aspects described herein relate to a method of wireless communication performed by a management network node. The method may include receiving, from a communication network node, a service activation request for a non-data wireless service (NDWS). The method may include transmitting, to a verification network node, a request associated with providing an NDWS configuration for the communication network node. The method may include receiving, from the verification network node, a configuration indication associated with the management network node providing the NDWS configuration for the communication network node.

Some aspects described herein relate to a method of wireless communication performed by a communication network node. The method may include transmitting, to a management network node, a service activation request for an NDWS. The method may include receiving, from the management network node, a configuration indication associated with an NDWS configuration for the communication network node.

Some aspects described herein relate to an apparatus for wireless communication performed by a management network node. The apparatus may include a memory and one or more processors, coupled to the memory. The one or more processors may be configured to receive, from a communication network node, a service activation request for an NDWS. The one or more processors may be configured to transmit, to a verification network node, a request associated with providing an NDWS configuration for the communication network node. The one or more processors may be configured to receive, from the verification network node, a configuration indication associated with the management network node providing the NDWS configuration for the communication network node.

Some aspects described herein relate to an apparatus for wireless communication performed by a communication network node. The apparatus may include a memory and one or more processors, coupled to the memory. The one or more processors may be configured to transmit, to a management network node, a service activation request for an NDWS. The one or more processors may be configured to receive, from the management network node, a configuration indication associated with an NDWS configuration for the communication network node.

Some aspects described herein relate to a non-transitory computer-readable medium that stores a set of instructions for wireless communication by a management network node. The set of instructions, when executed by one or more processors of the management network node, may cause the management network node to receive, from a communication network node, a service activation request for an NDWS. The set of instructions, when executed by one or more processors of the management network node, may cause the management network node to transmit, to a verification network node, a request associated with providing an NDWS configuration for the communication network node. The set of instructions, when executed by one or more processors of the management network node, may cause the management network node to receive, from the verification network node, a configuration indication associated with the management network node providing the NDWS configuration for the communication network node.

Some aspects described herein relate to a non-transitory computer-readable medium that stores a set of instructions for wireless communication by a communication network node. The set of instructions, when executed by one or more processors of the communication network node, may cause the communication network node to transmit, to a management network node, a service activation request for an NDWS. The set of instructions, when executed by one or more processors of the communication network node, may cause the communication network node to receive, from the management network node, a configuration indication associated with an NDWS configuration for the communication network node.

Some aspects described herein relate to an apparatus for wireless communication. The apparatus may include means for receiving, from a communication network node, a service activation request for an NDWS. The apparatus may include means for transmitting, to a verification network node, a request associated with providing an NDWS configuration for the apparatus. The apparatus may include means for receiving, from the verification network node, a configuration indication associated with the management network node providing the NDWS configuration for the apparatus.

Some aspects described herein relate to an apparatus for wireless communication. The apparatus may include means for transmitting, to a management network node, a service activation request for an NDWS. The apparatus may include means for receiving, from the management network node, a configuration indication associated with an NDWS configuration for the apparatus.

Aspects generally include a method, apparatus, system, computer program product, non-transitory computer-readable medium, user equipment, base station, wireless communication device, and/or processing system as substantially described herein with reference to and as illustrated by the drawings.

The foregoing has outlined rather broadly the features and technical advantages of examples according to the disclosure in order that the detailed description that follows may be better understood. Additional features and advantages will be described hereinafter. The conception and specific examples disclosed may be readily utilized as a basis for modifying or designing other structures for carrying out the same purposes of the present disclosure. Such equivalent constructions do not depart from the scope of the appended claims Characteristics of the concepts disclosed herein, both their organization and method of operation, together with associated advantages, will be better understood from the following description when considered in connection with the accompanying figures. Each of the figures is provided for the purposes of illustration and description, and not as a definition of the limits of the claims.

While aspects are described in the present disclosure by illustration to some examples, those skilled in the art will understand that such aspects may be implemented in many different arrangements and scenarios. Techniques described herein may be implemented using different platform types, devices, systems, shapes, sizes, and/or packaging arrangements. For example, some aspects may be implemented via integrated chip embodiments or other non-module-component based devices (e.g., end-user devices, vehicles, communication devices, computing devices, industrial equipment, retail/purchasing devices, medical devices, and/or artificial intelligence devices). Aspects may be implemented in chip-level components, modular components, non-modular components, non-chip-level components, device-level components, and/or system-level components. Devices incorporating described aspects and features may include additional components and features for implementation and practice of claimed and described aspects. For example, transmission and reception of wireless signals may include one or more components for analog and digital purposes (e.g., hardware components including antennas, radio frequency (RF) chains, power amplifiers, modulators, buffers, processors, interleavers, adders, and/or summers). It is intended that aspects described herein may be practiced in a wide variety of devices, components, systems, distributed arrangements, and/or end-user devices of varying size, shape, and constitution.

BRIEF DESCRIPTION OF THE DRAWINGS

So that the above-recited features of the present disclosure can be understood in detail, a more particular description, briefly summarized above, may be had by reference to aspects, some of which are illustrated in the appended drawings. It is to be noted, however, that the appended drawings illustrate only certain typical aspects of this disclosure and are therefore not to be considered limiting of its scope, for the description may admit to other equally effective aspects. The same reference numbers in different drawings may identify the same or similar elements.

DETAILED DESCRIPTION

Various aspects of the disclosure are described more fully hereinafter with reference to the accompanying drawings. This disclosure may, however, be embodied in many different forms and should not be construed as limited to any specific structure or function presented throughout this disclosure. Rather, these aspects are provided so that this disclosure will be thorough and complete, and will fully convey the scope of the disclosure to those skilled in the art. One skilled in the art should appreciate that the scope of the disclosure is intended to cover any aspect of the disclosure disclosed herein, whether implemented independently of or combined with any other aspect of the disclosure. For example, an apparatus may be implemented or a method may be practiced using any number of the aspects set forth herein. In addition, the scope of the disclosure is intended to cover such an apparatus or method which is practiced using other structure, functionality, or structure and functionality in addition to or other than the various aspects of the disclosure set forth herein. It should be understood that any aspect of the disclosure disclosed herein may be embodied by one or more elements of a claim.

Several aspects of telecommunication systems will now be presented with reference to various apparatuses and techniques. These apparatuses and techniques will be described in the following detailed description and illustrated in the accompanying drawings by various blocks, modules, components, circuits, steps, processes, algorithms, or the like (collectively referred to as "elements"). These elements may be implemented using hardware, software, or combinations thereof. Whether such elements are implemented as hardware or software depends upon the particular application and design constraints imposed on the overall system.

While aspects may be described herein using terminology commonly associated with a 5G or New Radio (NR) radio access technology (RAT), aspects of the present disclosure can be applied to other RATs, such as a 3G RAT, a 4G RAT, and/or a RAT subsequent to 5G (e.g., 6G).

Figure 1:
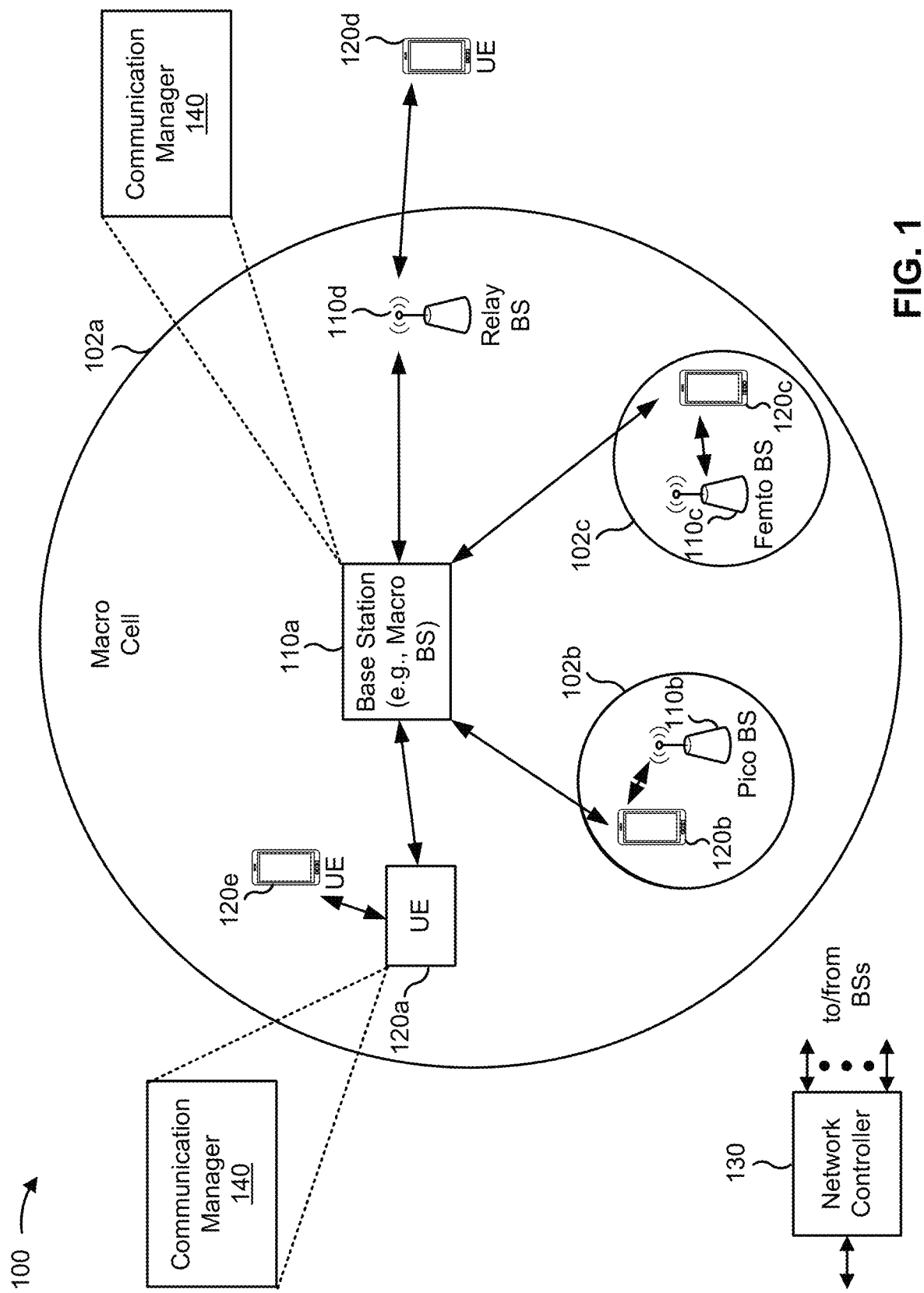
FIG. 1 is a diagram illustrating an example of a wireless network, in accordance with the present disclosure.

FIG. 1 is a diagram illustrating an example of a wireless network 100, in accordance with the present disclosure. The wireless network 100 may be or may include elements of a 5G (e.g., NR) network and/or a 4G (e.g., Long Term Evolution (LTE)) network, among other examples. The wireless network 100 may include one or more base stations 110 (shown as a BS 110a, a BS 110b, a BS 110c, and a BS 110d), a user equipment (UE) 120 or multiple UEs 120 (shown as a UE 120a, a UE 120b, a UE 120c, a UE 120d, and a UE 120e), and/or other network entities. A base station 110 is an entity that communicates with UEs 120. A base station 110 (sometimes referred to as a BS) may include, for example, an NR base station, an LTE base station, a Node B, an eNB (e.g., in 4G), a gNB (e.g., in 5G), an access point, and/or a transmission reception point (TRP). Each base station 110 may provide communication coverage for a particular geographic area. In the Third Generation Partnership Project (3GPP), the term "cell" can refer to a coverage area of a base station 110 and/or a base station subsystem serving this coverage area, depending on the context in which the term is used.

A base station 110 may provide communication coverage for a macro cell, a pico cell, a femto cell, and/or another type of cell. A macro cell may cover a relatively large geographic area (e.g., several kilometers in radius) and may allow unrestricted access by UEs 120 with service subscriptions. A pico cell may cover a relatively small geographic area and may allow unrestricted access by UEs 120 with service subscription. A femto cell may cover a relatively small geographic area (e.g., a home) and may allow restricted access by UEs 120 having association with the femto cell (e.g., UEs 120 in a closed subscriber group (CSG)). A base station 110 for a macro cell may be referred to as a macro base station. A base station 110 for a pico cell may be referred to as a pico base station. A base station 110 for a femto cell may be referred to as a femto base station or an in-home base station. In the example shown in FIG. 1, the BS 110a may be a macro base station for a macro cell 102a, the BS 110b may be a pico base station for a pico cell 102b, and the BS 110c may be a femto base station for a femto cell 102c. A base station may support one or multiple (e.g., three) cells.

In some examples, a cell may not necessarily be stationary, and the geographic area of the cell may move according to the location of a base station 110 that is mobile (e.g., a mobile base station). In some examples, the base stations 110 may be interconnected to one another and/or to one or more other base stations 110 or network nodes (not shown) in the wireless network 100 through various types of backhaul interfaces, such as a direct physical connection or a virtual network, using any suitable transport network.

The wireless network 100 may include one or more relay stations. A relay station is an entity that can receive a transmission of data from an upstream station (e.g., a base station 110 or a UE 120) and send a transmission of the data to a downstream station (e.g., a UE 120 or a base station 110). A relay station may be a UE 120 that can relay transmissions for other UEs 120. In the example shown in FIG. 1, the BS 110d (e.g., a relay base station) may communicate with the BS 110a (e.g., a macro base station) and the UE 120d in order to facilitate communication between the BS 110a and the UE 120d. A base station 110 that relays communications may be referred to as a relay station, a relay base station, a relay, or the like.

The wireless network 100 may be a heterogeneous network that includes base stations 110 of different types, such as macro base stations, pico base stations, femto base stations, relay base stations, or the like. These different types of base stations 110 may have different transmit power levels, different coverage areas, and/or different impacts on interference in the wireless network 100. For example, macro base stations may have a high transmit power level (e.g., 5 to 40 watts) whereas pico base stations, femto base stations, and relay base stations may have lower transmit power levels (e.g., 0.1 to 2 watts).

A network controller 130 may couple to or communicate with a set of base stations 110 and may provide coordination and control for these base stations 110. The network controller 130 may communicate with the base stations 110 via a backhaul communication link. The base stations 110 may communicate with one another directly or indirectly via a wireless or wireline backhaul communication link.

The UEs 120 may be dispersed throughout the wireless network 100, and each UE 120 may be stationary or mobile. A UE 120 may include, for example, an access terminal, a terminal, a mobile station, and/or a subscriber unit. A UE 120 may be a cellular phone (e.g., a smart phone), a personal digital assistant (PDA), a wireless modem, a wireless communication device, a handheld device, a laptop computer, a cordless phone, a wireless local loop (WLL) station, a tablet, a camera, a gaming device, a netbook, a smartbook, an ultrabook, a medical device, a biometric device, a wearable device (e.g., a smart watch, smart clothing, smart glasses, a smart wristband, smart jewelry (e.g., a smart ring or a smart bracelet)), an entertainment device (e.g., a music device, a video device, and/or a satellite radio), a vehicular component or sensor, a smart meter/sensor, industrial manufacturing equipment, a global positioning system device, and/or any other suitable device that is configured to communicate via a wireless medium.

Some UEs 120 may be considered machine-type communication (MTC) or evolved or enhanced machine-type communication (eMTC) UEs. An MTC UE and/or an eMTC UE may include, for example, a robot, a drone, a remote device, a sensor, a meter, a monitor, and/or a location tag, that may communicate with a base station, another device (e.g., a remote device), or some other entity. Some UEs 120 may be considered Internet-of-Things (IoT) devices, and/or may be implemented as NB-IoT (narrowband IoT) devices. Some UEs 120 may be considered a Customer Premises Equipment. A UE 120 may be included inside a housing that houses components of the UE 120, such as processor components and/or memory components. In some examples, the processor components and the memory components may be coupled together. For example, the processor components (e.g., one or more processors) and the memory components (e.g., a memory) may be operatively coupled, communicatively coupled, electronically coupled, and/or electrically coupled.

In general, any number of wireless networks 100 may be deployed in a given geographic area. Each wireless network 100 may support a particular RAT and may operate on one or more frequencies. A RAT may be referred to as a radio technology, an air interface, or the like. A frequency may be referred to as a carrier, a frequency channel, or the like. Each frequency may support a single RAT in a given geographic area in order to avoid interference between wireless networks of different RATs. In some cases, NR or 5G RAT networks may be deployed.

In some examples, two or more UEs 120 (e.g., shown as UE 120a and UE 120e) may communicate directly using one or more sidelink channels (e.g., without using a base station 110 as an intermediary to communicate with one another). For example, the UEs 120 may communicate using peer-to-peer (P2P) communications, device-to-device (D2D) communications, a vehicle-to-everything (V2X) protocol (e.g., which may include a vehicle-to-vehicle (V2V) protocol, a vehicle-to-infrastructure (V2I) protocol, or a vehicle-to-pedestrian (V2P) protocol), and/or a mesh network. In such examples, a UE 120 may perform scheduling operations, resource selection operations, and/or other operations described elsewhere herein as being performed by the base station 110.

Devices of the wireless network 100 may communicate using the electromagnetic spectrum, which may be subdivided by frequency or wavelength into various classes, bands, channels, or the like. For example, devices of the wireless network 100 may communicate using one or more operating bands. In 5G NR, two initial operating bands have been identified as frequency range designations FR1 (410 MHz-7.125 GHz) and FR2 (24.25 GHz-52.6 GHz). It should be understood that although a portion of FR1 is greater than 6 GHz, FR1 is often referred to (interchangeably) as a "Sub-6 GHz" band in various documents and articles. A similar nomenclature issue sometimes occurs with regard to FR2, which is often referred to (interchangeably) as a "millimeter wave" band in documents and articles, despite being different from the extremely high frequency (EHF) band (30 GHz-300 GHz) which is identified by the International Telecommunications Union (ITU) as a "millimeter wave" band.

The frequencies between FR1 and FR2 are often referred to as mid-band frequencies. Recent 5G NR studies have identified an operating band for these mid-band frequencies as frequency range designation FR3 (7.125 GHz-24.25 GHz). Frequency bands falling within FR3 may inherit FR1 characteristics and/or FR2 characteristics, and thus may effectively extend features of FR1 and/or FR2 into mid-band frequencies. In addition, higher frequency bands are currently being explored to extend 5G NR operation beyond 52.6 GHz. For example, three higher operating bands have been identified as frequency range designations FR4a or FR4-1 (52.6 GHz-71 GHz), FR4 (52.6 GHz-114.25 GHz), and FR5 (114.25 GHz-300 GHz). Each of these higher frequency bands falls within the EHF band.

With the above examples in mind, unless specifically stated otherwise, it should be understood that the term "sub-6 GHz" or the like, if used herein, may broadly represent frequencies that may be less than 6 GHz, may be within FR1, or may include mid-band frequencies. Further, unless specifically stated otherwise, it should be understood that the term "millimeter wave" or the like, if used herein, may broadly represent frequencies that may include mid-band frequencies, may be within FR2, FR4, FR4-a or FR4-1, and/or FR5, or may be within the EHF band. It is contemplated that the frequencies included in these operating bands (e.g., FR1, FR2, FR3, FR4, FR4-a, FR4-1, and/or FR5) may be modified, and techniques described herein are applicable to those modified frequency ranges.

In some aspects, the communication network node may include a communication manager 140. As described in more detail elsewhere herein, the communication manager 140 may transmit, to a management network node, a service activation request for a non-data wireless service (NDWS); and receive, from the management network node, a configuration indication associated with an NDWS configuration for the communication network node. Additionally, or alternatively, the communication manager 140 may perform one or more other operations described herein.

As indicated above, FIG. 1 is provided as an example. Other examples may differ from what is described with regard to FIG. 1.

Figure 2:
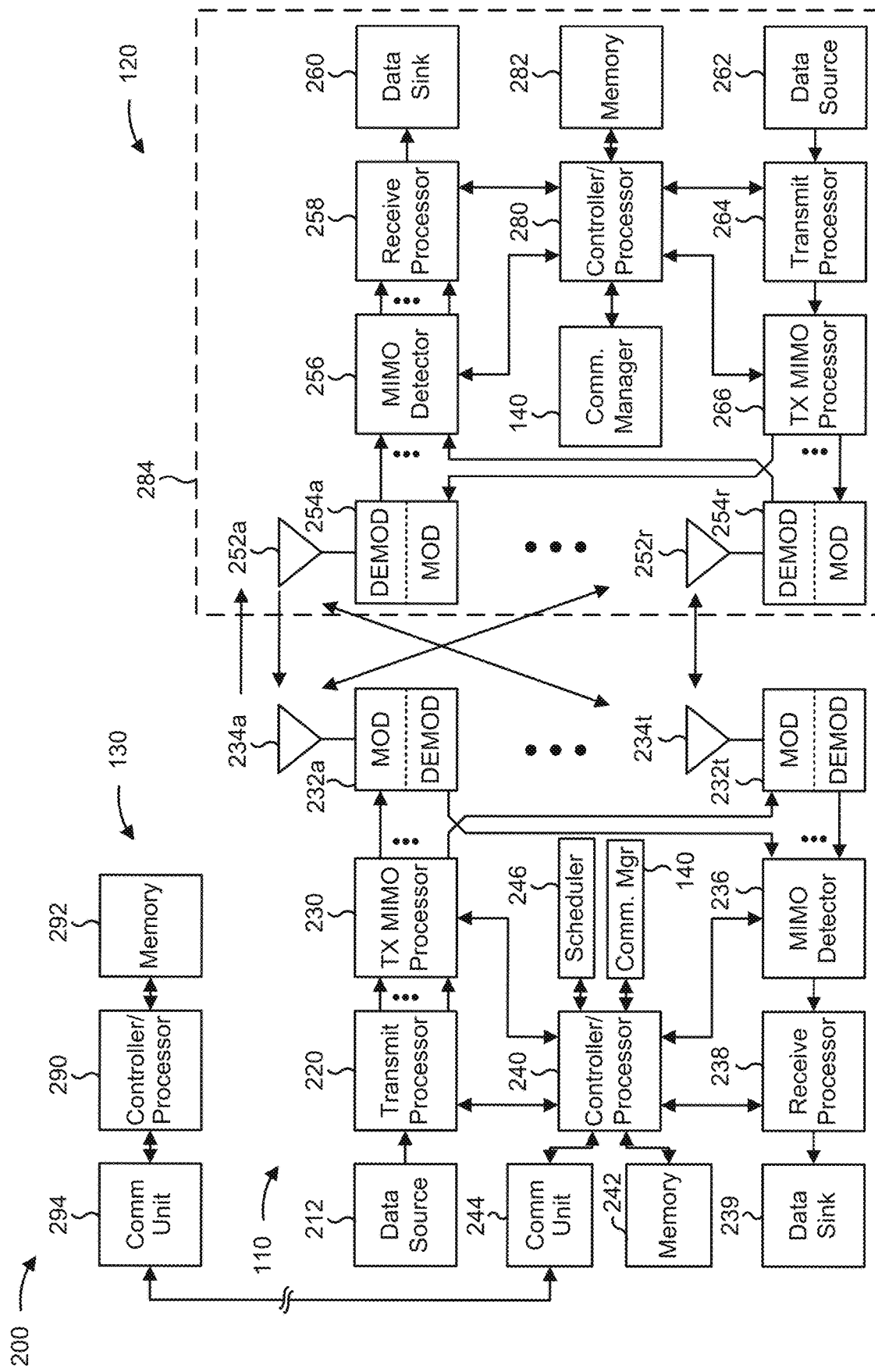
FIG. 2 is a diagram illustrating an example of a base station in communication with a user equipment (UE) in a wireless network, in accordance with the present disclosure.

FIG. 2 is a diagram illustrating an example 200 of a base station 110 in communication with a UE 120 in a wireless network 100, in accordance with the present disclosure. The base station 110 may be equipped with a set of antennas 234a through 234t, such as T antennas (T≥1). The UE 120 may be equipped with a set of antennas 252a through 252r, such as R antennas (R≥1).

At the base station 110, a transmit processor 220 may receive data, from a data source 212, intended for the UE 120 (or a set of UEs 120). The transmit processor 220 may select one or more modulation and coding schemes (MCSs) for the UE 120 based at least in part on one or more channel quality indicators (CQIs) received from that UE 120. The base station 110 may process (e.g., encode and modulate) the data for the UE 120 based at least in part on the MCS(s) selected for the UE 120 and may provide data symbols for the UE 120. The transmit processor 220 may process system information (e.g., for semi-static resource partitioning information (SRPI)) and control information (e.g., CQI requests, grants, and/or upper layer signaling) and provide overhead symbols and control symbols. The transmit processor 220 may generate reference symbols for reference signals (e.g., a cell-specific reference signal (CRS) or a demodulation reference signal (DMRS)) and synchronization signals (e.g., a primary synchronization signal (PSS) or a secondary synchronization signal (SSS)). A transmit (TX) multiple-input multiple-output (MIMO) processor 230 may perform spatial processing (e.g., precoding) on the data symbols, the control symbols, the overhead symbols, and/or the reference symbols, if applicable, and may provide a set of output symbol streams (e.g., T output symbol streams) to a corresponding set of modems 232 (e.g., T modems), shown as modems 232a through 232t. For example, each output symbol stream may be provided to a modulator component (shown as MOD) of a modem 232. Each modem 232 may use a respective modulator component to process a respective output symbol stream (e.g., for OFDM) to obtain an output sample stream. Each modem 232 may further use a respective modulator component to process (e.g., convert to analog, amplify, filter, and/or upconvert) the output sample stream to obtain a downlink signal. The modems 232a through 232t may transmit a set of downlink signals (e.g., T downlink signals) via a corresponding set of antennas 234 (e.g., T antennas), shown as antennas 234a through 234t.

At the UE 120, a set of antennas 252 (shown as antennas 252a through 252r) may receive the downlink signals from the base station 110 and/or other base stations 110 and may provide a set of received signals (e.g., R received signals) to a set of modems 254 (e.g., R modems), shown as modems 254a through 254r. For example, each received signal may be provided to a demodulator component (shown as DEMOD) of a modem 254. Each modem 254 may use a respective demodulator component to condition (e.g., filter, amplify, downconvert, and/or digitize) a received signal to obtain input samples. Each modem 254 may use a demodulator component to further process the input samples (e.g., for OFDM) to obtain received symbols. A MIMO detector

256 may obtain received symbols from the modems 254, may perform MIMO detection on the received symbols if applicable, and may provide detected symbols. A receive processor 258 may process (e.g., demodulate and decode) the detected symbols, may provide decoded data for the UE 120 to a data sink 260, and may provide decoded control information and system information to a controller/processor 280. The term "controller/processor" may refer to one or more controllers, one or more processors, or a combination thereof. A channel processor may determine a reference signal received power (RSRP) parameter, a received signal strength indicator (RSSI) parameter, a reference signal received quality (RSRQ) parameter, and/or a CQI parameter, among other examples. In some examples, one or more components of the UE 120 may be included in a housing 284.

The network controller 130 may include a communication unit 294, a controller/processor 290, and a memory 292. The network controller 130 may include, for example, one or more devices in a core network. The network controller 130 may communicate with the base station 110 via the communication unit 294.

One or more antennas (e.g., antennas 234a through 234t and/or antennas 252a through 252r) may include, or may be included within, one or more antenna panels, one or more antenna groups, one or more sets of antenna elements, and/or one or more antenna arrays, among other examples. An antenna panel, an antenna group, a set of antenna elements, and/or an antenna array may include one or more antenna elements (within a single housing or multiple housings), a set of coplanar antenna elements, a set of non-coplanar antenna elements, and/or one or more antenna elements coupled to one or more transmission and/or reception components, such as one or more components of FIG. 2.

On the uplink, at the UE 120, a transmit processor 264 may receive and process data from a data source 262 and control information (e.g., for reports that include RSRP, RSSI, RSRQ, and/or CQI) from the controller/processor 280. The transmit processor 264 may generate reference symbols for one or more reference signals. The symbols from the transmit processor 264 may be precoded by a TX MIMO processor 266 if applicable, further processed by the modems 254 (e.g., for DFT-s-OFDM or CP-OFDM), and transmitted to the base station 110. In some examples, the modem 254 of the UE 120 may include a modulator and a demodulator. In some examples, the UE 120 includes a transceiver. The transceiver may include any combination of the antenna(s) 252, the modem(s) 254, the MIMO detector 256, the receive processor 258, the transmit processor 264, and/or the TX MIMO processor 266. The transceiver may be used by a processor (e.g., the controller/processor 280) and the memory 282 to perform aspects of any of the methods described herein (e.g., with reference to FIGS. 5-9).

At the base station 110, the uplink signals from UE 120 and/or other UEs may be received by the antennas 234, processed by the modem 232 (e.g., a demodulator component, shown as DEMOD, of the modem 232), detected by a MIMO detector 236 if applicable, and further processed by a receive processor 238 to obtain decoded data and control information sent by the UE 120. The receive processor 238 may provide the decoded data to a data sink 239 and provide the decoded control information to the controller/processor 240. The base station 110 may include a communication unit 244 and may communicate with the network controller 130 via the communication unit 244. The base station 110 may include a scheduler 246 to schedule one or more UEs 120 for downlink and/or uplink communications. In some examples, the modem 232 of the base station 110 may include a modulator and a demodulator. In some examples, the base station 110 includes a transceiver. The transceiver may include any combination of the antenna(s) 234, the modem(s) 232, the MIMO detector 236, the receive processor 238, the transmit processor 220, and/or the TX MIMO processor 230. The transceiver may be used by a processor (e.g., the controller/processor 240) and the memory 242 to perform aspects of any of the methods described herein (e.g., with reference to FIGS. 5-9).

The controller/processor 240 of the base station 110, the controller/processor 280 of the UE 120, and/or any other component(s) of FIG. 2 may perform one or more techniques associated with a subscription for NDWS, as described in more detail elsewhere herein. In some aspects, a communication network node described herein may be the base station 110, may be included in the base station 110, or may include one or more components of the base station 110 shown in FIG. 2. In some aspects, the communication network node described herein may be the UE 120, may be included in the UE 120, or may include one or more components of the UE 120 shown in FIG. 2. For example, the controller/processor 240 of the base station 110, the controller/processor 280 of the UE 120, and/or any other component(s) of FIG. 2 may perform or direct operations of, for example, process 600 of FIG. 6, process 700 of FIG. 7, and/or other processes as described herein. The memory 242 and the memory 282 may store data and program codes for the base station 110 and the UE 120, respectively. In some examples, the memory 242 and/or the memory 282 may include a non-transitory computer-readable medium storing one or more instructions (e.g., code and/or program code) for wireless communication. For example, the one or more instructions, when executed (e.g., directly, or after compiling, converting, and/or interpreting) by one or more processors of the base station 110 and/or the UE 120, may cause the one or more processors, the UE 120, and/or the base station 110 to perform or direct operations of, for example, process 600 of FIG. 6, process 700 of FIG. 7, and/or other processes as described herein. In some examples, executing instructions may include running the instructions, converting the instructions, compiling the instructions, and/or interpreting the instructions, among other examples.

In some aspects, a management network node includes means for receiving, from a communication network node, a service activation request for an NDWS; means for transmitting, to a verification network node, a request associated with providing an NDWS configuration for the communication network node; and/or means for receiving, from the verification network node, a configuration indication associated with the management network node providing the NDWS configuration for the communication network node. In some aspects, the means for the management network node to perform the operations described herein may include, for example, one or more of a processor 820, a memory 830, an input component 840, an output component 850, and/or a communication component 860.

In some aspects, the communication network node includes means for transmitting, to the management network node, a service activation request for an NDWS; and/or means for receiving, from the management network node, a configuration indication associated with an NDWS configuration for the communication network node. In some aspects, the means for the communication network node to perform operations described herein may include, for example, one or more of communication manager 140, transmit processor 220, TX MIMO processor 230, modem 232, antenna 234, MIMO detector 236, receive processor 238, controller/processor 240, memory 242, or scheduler 246. In some aspects, the means for the communication network node to perform operations described herein may include, for example, one or more of communication manager 140, antenna 252, modem 254, MIMO detector 256, receive processor 258, transmit processor 264, TX MIMO processor 266, controller/processor 280, or memory 282.

While blocks in FIG. 2 are illustrated as distinct components, the functions described above with respect to the blocks may be implemented in a single hardware, software, or combination component or in various combinations of components. For example, the functions described with respect to the transmit processor 264, the receive processor 258, and/or the TX MIMO processor 266 may be performed by or under the control of the controller/processor 280.

As indicated above, FIG. 2 is provided as an example. Other examples may differ from what is described with regard to FIG. 2.

Figure 3:
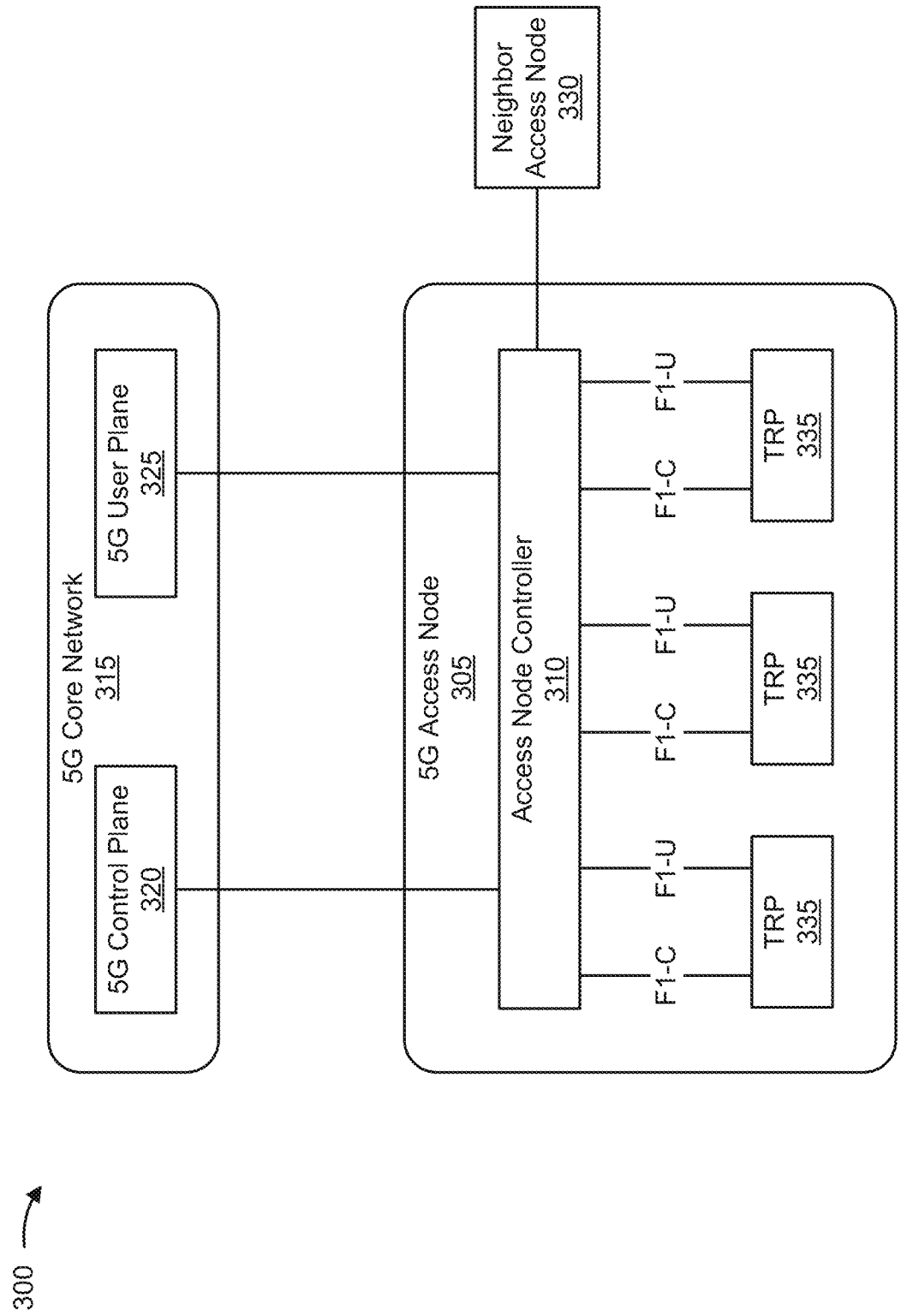
FIG. 3 is a diagram illustrating an example logical architecture of a distributed radio access network, in accordance with the present disclosure.

FIG. 3 illustrates an example logical architecture of a distributed RAN 300, in accordance with the present disclosure.

A 5G access node 305 may include an access node controller 310. The access node controller 310 may be a central unit (CU) of the distributed RAN 300. In some aspects, a backhaul interface to a 5G core network 315 may terminate at the access node controller 310. The 5G core network 315 may include a 5G control plane component 320 and a 5G user plane component 325 (e.g., a 5G gateway), and the backhaul interface for one or both of the 5G control plane and the 5G user plane may terminate at the access node controller 310. Additionally, or alternatively, a backhaul interface to one or more neighbor access nodes 330 (e.g., another 5G access node 305 and/or an LTE access node) may terminate at the access node controller 310.

The access node controller 310 may include and/or may communicate with one or more TRPs 335 (e.g., via an F1 Control (F1-C) interface and/or an F1 User (F1-U) interface). A TRP 335 may be a distributed unit (DU) of the distributed RAN 300. In some aspects, a TRP 335 may correspond to a base station 110 described above in connection with FIG. 1. For example, different TRPs 335 may be included in different base stations 110. Additionally, or alternatively, multiple TRPs 335 may be included in a single base station 110. In some aspects, a base station 110 may include a CU (e.g., access node controller 310) and/or one or more DUs (e.g., one or more TRPs 335). In some cases, a TRP 335 may be referred to as a cell, a panel, an antenna array, or an array.

A TRP 335 may be connected to a single access node controller 310 or to multiple access node controllers 310. In some aspects, a dynamic configuration of split logical functions may be present within the architecture of distributed RAN 300. For example, a packet data convergence protocol (PDCP) layer, a radio link control (RLC) layer, and/or a medium access control (MAC) layer may be configured to terminate at the access node controller 310 or at a TRP 335.

In some aspects, multiple TRPs 335 may transmit communications (e.g., the same communication or different communications) in the same transmission time interval (TTI) (e.g., a slot, a mini-slot, a subframe, or a symbol) or different TTIs using different quasi co-location (QCL) relationships (e.g., different spatial parameters, different transmission configuration indicator (TCI) states, different precoding parameters, and/or different beamforming parameters). In some aspects, a TCI state may be used to indicate one or more QCL relationships. A TRP 335 may be configured to individually (e.g., using dynamic selection) or jointly (e.g., using joint transmission with one or more other TRPs 335) serve traffic to a UE 120.

In some aspects, as described further herein, the TRP 335 may be a network node, such as a management network node, that is configured to provide an NDWS configuration.

As indicated above, FIG. 3 is provided as an example. Other examples may differ from what was described with regard to FIG. 3.

Figure 4:
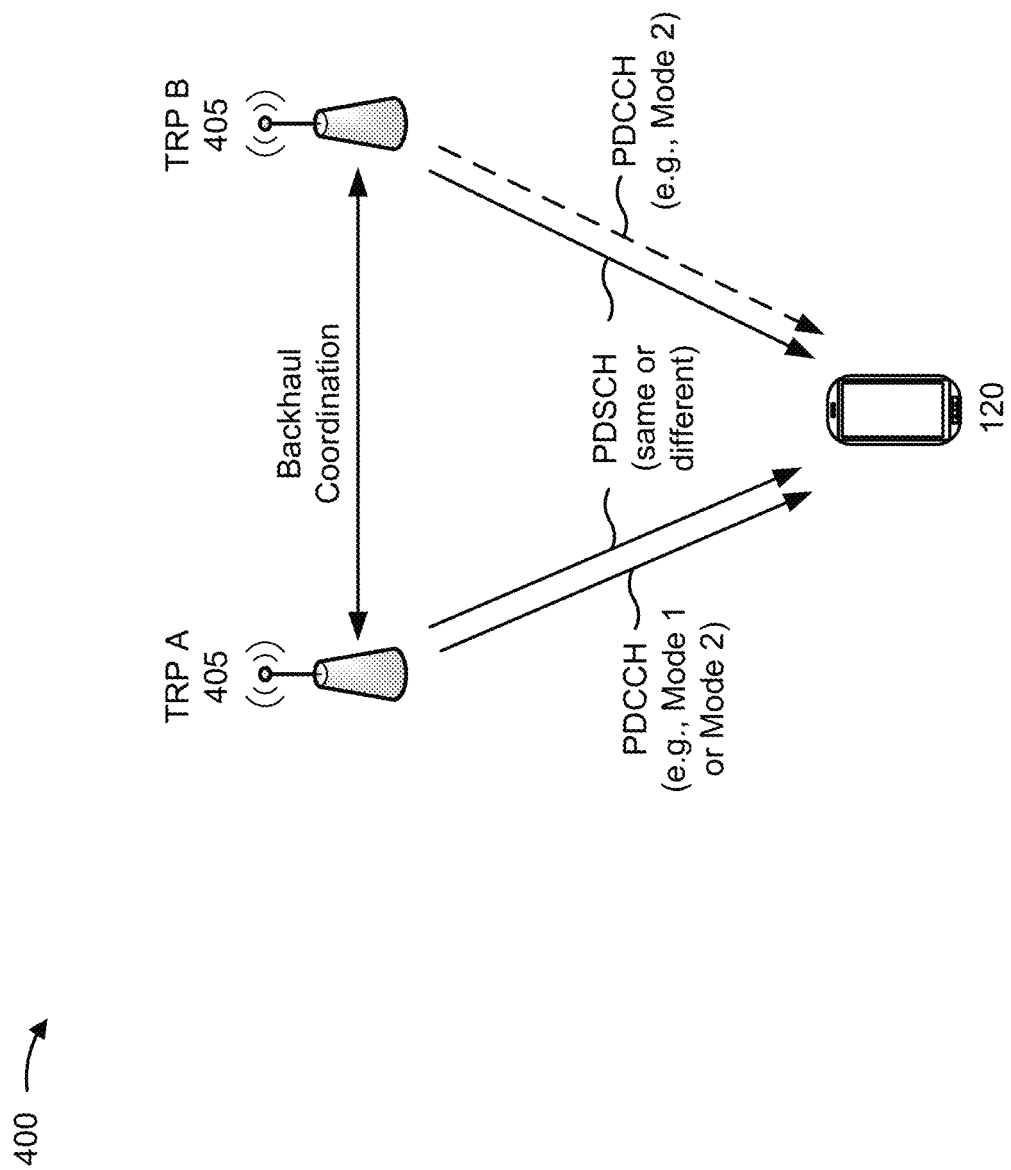
FIG. 4 is a diagram illustrating an example of multi-TRP communication, in accordance with the present disclosure.

FIG. 4 is a diagram illustrating an example 400 of multi-TRP communication, in accordance with the present disclosure. As shown in FIG. 4, multiple TRPs 405 may communicate with the same UE 120. A TRP 405 may correspond to a TRP 335 described above in connection with FIG. 3.

The multiple TRPs 405 (shown as TRP A and TRP B) may communicate with the same UE 120 in a coordinated manner (e.g., using coordinated multipoint transmissions) to improve reliability and/or increase throughput. The TRPs 405 may coordinate such communications via an interface between the TRPs 405 (e.g., a backhaul interface and/or an access node controller 310). The interface may have a smaller delay and/or higher capacity when the TRPs 405 are co-located at the same base station 110 (e.g., when the TRPs 405 are different antenna arrays or panels of the same base station 110), and may have a larger delay and/or lower capacity (as compared to co-location) when the TRPs 405 are located at different base stations 110. The different TRPs 405 may communicate with the UE 120 using different QCL relationships (e.g., different TCI states), different demodulation reference signal (DMRS) ports, and/or different layers (e.g., of a multi-layer communication).

In a first multi-TRP transmission mode (e.g., Mode 1), a single physical downlink control channel (PDCCH) may be used to schedule downlink data communications for a single physical downlink shared channel (PDSCH). In this case, multiple TRPs 405 (e.g., TRP A and TRP B) may transmit communications to the UE 120 on the same PDSCH. For example, a communication may be transmitted using a single codeword with different spatial layers for different TRPs 405 (e.g., where one codeword maps to a first set of layers transmitted by a first TRP 405 and maps to a second set of layers transmitted by a second TRP 405). In an example, a communication may be transmitted using multiple codewords, where different codewords are transmitted by different TRPs 405 (e.g., using different sets of layers). In either case, different TRPs 405 may use different QCL relationships (e.g., different TCI states) for different DMRS ports corresponding to different layers. For example, a first TRP 405 may use a first QCL relationship or a first TCI state for a first set of DMRS ports corresponding to a first set of layers, and a second TRP 405 may use a second (different) QCL relationship or a second (different) TCI state for a second (different) set of DMRS ports corresponding to a second (different) set of layers. In some aspects, a TCI state in downlink control information (DCI) (e.g., transmitted on the PDCCH, such as DCI format 1_0 or DCI format 1_1) may indicate the first QCL relationship (e.g., by indicating a first TCI state) and the second QCL relationship (e.g., by indicating a second TCI state). The first and the second TCI states may be indicated using a TCI field in the DCI. In general, the TCI field can indicate a single TCI state (for single-TRP transmission) or multiple TCI states (for multi-TRP transmission as discussed here) in this multi-TRP transmission mode (e.g., Mode 1).

In a second multi-TRP transmission mode (e.g., Mode 2), multiple PDCCHs may be used to schedule downlink data communications for multiple corresponding PDSCHs (e.g., one PDCCH for each PDSCH). In this case, a first PDCCH may schedule a first codeword to be transmitted by a first TRP 405, and a second PDCCH may schedule a second codeword to be transmitted by a second TRP 405. Furthermore, first DCI (e.g., transmitted by the first TRP 405) may schedule a first PDSCH communication associated with a first set of DMRS ports with a first QCL relationship (e.g., indicated by a first TCI state) for the first TRP 405, and second DCI (e.g., transmitted by the second TRP 405) may schedule a second PDSCH communication associated with a second set of DMRS ports with a second QCL relationship (e.g., indicated by a second TCI state) for the second TRP 405. In this case, DCI (e.g., having DCI format 1_0 or DCI format 1_1) may indicate a corresponding TCI state for a TRP 405 corresponding to the DCI. The TCI field of a DCI indicates the corresponding TCI state (e.g., the TCI field of the first DCI indicates the first TCI state and the TCI field of the second DCI indicates the second TCI state).

In some cases, the management network node may be configured to provide a communication network node (e.g., the UE 120 or the base station 110) with a configuration for providing one or more services. In some cases, providing the one or more services may require the transfer of data, such as data associated with a cellular network. For example, base station 110 may need to establish a data session with the UE 120 in order to provide the services. However, at least some of the services may be provided, or may be received, without requiring the transfer of data (e.g., without requiring user plane signaling), or the establishment of a data session. Thus, transferring data in order to provide the services may use a larger amount of time and frequency resources than is necessary, which may cause, or contribute to, an overloading of the network.

Techniques and apparatuses are described herein for providing an NDWS. In some aspects, the management network node may receive, from a communication network node, a service activation request for the NDWS. The NDWS may include a positioning service, a radio frequency sensing service, or a timing synchronization service. The management network node may transmit, to a verification network node, a request associated with providing an NDWS configuration to the communication network node, and may receive, from the verification network node, a configuration indication associated with the management network node providing the NDWS configuration to the communication network node. For example, the verification network node may indicate that the management network node may provide the NDWS configuration to the communication network node. The communication network node may communicate using one or more NDWS reference signals, in accordance with the NDWS configuration, and without using data, such as cellular data.

As described above, one or more services provided by the communication network node, or received by the communication network node, may not require the transfer of data, or the establishment of a data session. Thus, transferring data in order to provide the services may use a larger amount of time and frequency resources than is necessary, which may cause, or contribute to, an overloading of the network. The NDWS configuration described herein may enable the communication network node to provide one or more services, or receive one or more services, without transferring data, or without establishing a data session. Thus, providing the one or more services in accordance with the NDWS configuration, such as using NDWS reference signals, may reduce the load on the network.

As indicated above, FIG. 4 is provided as an example. Other examples may differ from what is described with respect to FIG. 4.

Figure 5:
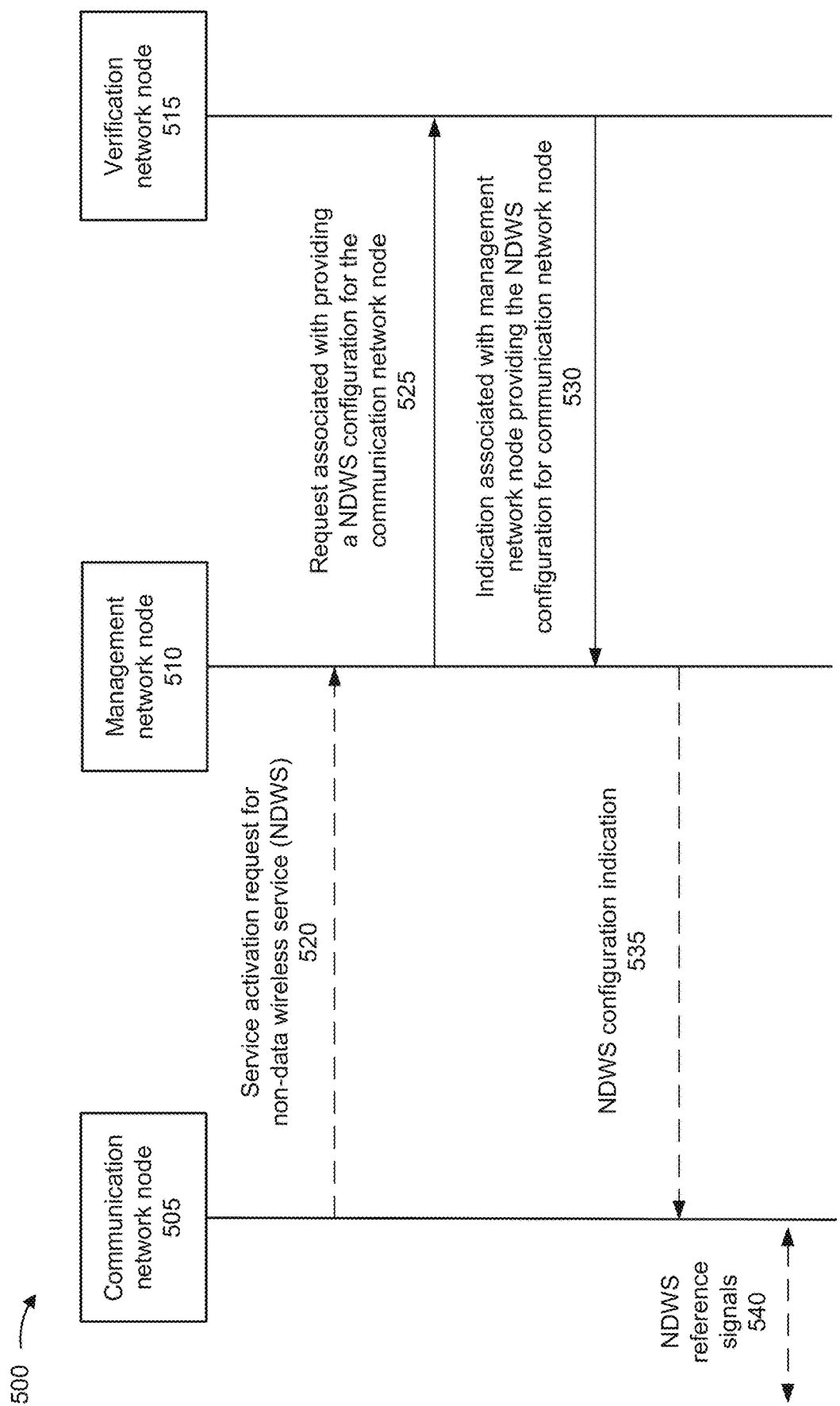
FIG. 5 is a diagram illustrating an example associated with subscription for a non-data wireless service (NDWS), in accordance with the present disclosure.

FIG. 5 is a diagram illustrating an example 500 of a subscription for NDWS, in accordance with the present disclosure. A communication network node 505 may communicate with a management network node 510. In some aspects, the communication network node 505 may be a UE, such as the UE 120, or a base station, such as the base station 110. In some aspects, the management network node 510 may be a non-data management function (NDMF). The management network node 510 may communicate with a verification network node 515. In some aspects, the verification network node 515 may be a unified data management (UDM) function.

As described in more detail below, the communication network node 505, when implemented as the base station 110, may be configured to provide service configurations (e.g., NDWS configurations) to the UE 120 and the management network node 510, perform measurements (e.g., beam measurements or cell measurements) and send reports to the UE 120 and management network node 510, and/or communicate (e.g., transmit and receive) non-data reference signals (ND-RSs). The communication network node 505, when implemented as the UE 120, may be configured to perform measurements and send reports to the base station 110 and the management network node 510, process measurements received from the base station 110, compute and provide parameters related to the NDWS, and/or communicate ND-RSs. The management network node 510 may be configured to coordinate service configuration and execution with the communication network node 505 (e.g., the UE 120 and/or the base station 110), process measurements received from the communication network node 505, and/or compute and provide parameters related to the NDWS.

As shown in connection with reference number 520, the communication network node 505 may transmit, and the management network node 510 may receive, a service activation request for the NDWS. In some aspects, the NDWS may be integrated with data services, such as cellular data services. In some aspects, the NDWS may be a standalone NDWS, and may not be integrated with other services. For example, the base station 110 may be a standalone network node that provides the NDWS. In some aspects, the communication network node 505 and the management network node 510 may communicate, using a Uu interface, to configure the NDWS.

As described above, the communication network node 505 may be the UE 120 or the base station 110. In the example that the communication network node is the base station 110, the service activation request may indicate that the base station 110 is configured to provide the NDWS, and one or more data services (e.g., cellular data services), for the UE 120. Alternatively, the service activation request may indicate that the base station 110 is configured to provide services that include only the NDWS for the UE 120. In the example that the communication network node 505 is the UE 120, the service activation request may indicate that the UE 120 is configured to receive the NDWS, and one or more data services (e.g., cellular data services), from the base station 110. Alternatively, the service activation request may indicate that the UE 120 is configured to receive services that include only the NDWS from the base station 110. In some aspects, the service activation request may be received from another device (e.g., an external client) that is not the communication network node 505.

As shown in connection with reference number 525, the management network node 510 may transmit, and the verification network node 515 may receive, a request associated with providing an NDWS configuration for the communication network node 505. In some aspects, the verification network node 515 may store, or may otherwise access, information associated with the NDWS configuration, such as a location where the NDWS can be provided, or whether the user associated with the communication network node 505 is required to consent to receiving the NDWS configuration, among other examples.

In some aspects, the NDWS configuration may enable the communication network node 505 to provide the NDWS without requiring user plane signaling. In some aspects, the NDWS configuration may enable the communication network node 505 to provide the NDWS using signaling that includes only control plane signaling. In some aspects, the NDWS may be a positioning service, a radio frequency sensing service, or a timing synchronization service.

In some aspects, the positioning service may be used to determine a location of a device. For example, the base station 110 may use the positioning service to determine a location of the UE 120. An example of a positioning service may be a global positioning system (GPS) service.

In some aspects, a radio frequency (RF) sensing service may be used for determining information based at least in part on signals being reflected off objects. An example application for RF sensing may include object detecting and tracking. In an example, RF sensing may be used for detecting and tracking objects in an environment (e.g., an indoor factory, a private network, a room, a store, a public park, or a traffic intersection, among other examples), for security (e.g., intruder detection), and/or for in-store sensing (e.g., counting or locating customers). In an example, RF sensing may be used for gesture recognition, such as gesture identification (e.g., hand waving) and/or home appliance control using gestures. In an example, RF sensing may be used for healthcare purposes, such as for remote diagnostics (e.g., sleep monitoring, vitals monitoring, or behavior monitoring, among other examples) and/or fall detection.

In some aspects, the timing synchronization service may be used for ensuring a synchronized and accurate time across a plurality of devices (e.g., UEs 120). For example, devices associated with sensors, actuators, and other machines (e.g., in a factory setup), devices in a home environment associated with audio-video applications, and/or generators in an electrical grid, may be synchronized using the timing synchronization service, among other examples. In some aspects, the devices may be synchronized using a single time reference, or using multiple time references.

As shown in connection with reference number 530, the verification network node 515 may transmit, and the management network node 510 may receive, a configuration indication associated with the management network node 510 providing the NDWS configuration for the communication network node 505. For example, the verification network node 515 may transmit an indication that the management network node 510 may provide the NDWS configuration to the communication network node 505 (e.g., may configure the communication network node 505 with the NDWS configuration).

In some aspects, the indication may indicate that the communication network node 505 is authorized to receive the NDWS (e.g., in the example that the communication network node 505 is the UE 120), or that the communication network node is authorized to provide the NDWS (e.g., in the example that the communication network node 505 is the base station 110).

In some aspects, the indication may indicate information associated with providing the NDWS. In some aspects, the information may include an indication of an area where the NDWS can be provided. For example, the UE 120 may only be able to use the NDWS when the UE 120 is within a particular area, or at a particular location. In some aspects, the information may include an indication of whether consent is required from the communication network node 505. For example, the communication network node 505 may need to provide consent prior to being configured with the NDWS configuration. Additionally, or alternatively, the communication network node 505 may need to provide consent prior to receiving a service associated with the NDWS configuration. In some aspects, as described above, the information (e.g., the area information and/or the consent information) may be stored at the verification network node 515.

As shown in connection with reference number 535, the management network node 510 may transmit an NDWS configuration indication to the communication network node 505. For example, the management network node 510 may transmit the NDWS configuration to the communication network node 505. In some aspects, the management network node 510 may configure the communication network node 505 with the NDWS configuration. The NDWS configuration may include an indication of one or more NDWS reference signals. As described in more detail below, the NDWS reference signals may be used by the communication network node 505 for NDWS communications. In some aspects, the NDWS configuration may indicate a set of time and frequency resources for providing the NDWS. For example, the NDWS configuration may indicate a set of time and frequency resources for communicating the NDWS reference signals.

In some aspects, transmitting the indication associated with the NDWS configuration may include configuring the communication network node 505 (e.g., the base station 110) with the NDWS configuration. In some aspects, transmitting the indication associated with the NDWS configuration may include an indication to configure another device with the NDWS configuration. For example, the indication may indicate for the base station 110 to provide the NDWS configuration to the UE 120. In some aspects, the base station 110 may provide the UE 120 with the NDWS configuration via a radio resource control (RRC) message (e.g., a unicast RRC message). In some aspects, the base station 110 may broadcast the selected NDWS configuration (e.g., via a broadcast RRC message that is received by the UE 120).

As shown in connection with reference number 540, the communication network node 505 may communicate in accordance with the NDWS. For example, the communication network node 505 may communicate using the one or more NDWS reference signals. In the example that the communication network node 505 is the base station 110, the communication network node 505 may communicate with one or more UEs 120, or one or more other base stations 110, using the NDWS reference signals. In the example that the communication network node 505 is the UE 120, the communication network node 505 may communicate with one or more base stations 110, or one or more other UEs 120, using the NDWS reference signals.

In some aspects, the communication network node 505 may perform one or more measurements associated with the NDWS reference signals. For example, the communication network node 505 may perform one or more positioning measurements associated with a positioning reference signal, one or more sensing measurements associated with an RF sensing reference signal, and/or one or more timing measurements associated with a timing synchronization reference signal. In some aspects, the communication network node 505 may transmit the one or more measurements associated with the NDWS reference signals to the management network node 510.

In some aspects, the management network node 510 may receive the one or more measurements associated with the NDWS reference signals, and may process the one or more measurements associated with the NDWS reference signals. For example, the management network node 510 may process the positioning measurements to determine positioning information (e.g., to determine a GPS location), may process the sensing measurements to determine sensing information (e.g., to track an object in an environment), and/or may process the timing measurements to determine timing information (e.g., to perform timing synchronization between two devices).

As described above, one or more services provided by the communication network node 505, or received by the communication network node 505, may not require the transfer of data, or the establishment of a data session. Thus, transferring data in order to provide the services may use a larger amount of time and frequency resources than is necessary, which may cause, or contribute to, an overloading of the network. The NDWS configuration described herein may enable the communication network node 505 to provide one or more services, or receive one or more services, without transferring data (e.g., without using control plane signaling), or without establishing a data session. Thus, providing the one or more services in accordance with the NDWS configuration, such as using NDWS reference signals, may reduce the load on the network.

As indicated above, FIG. 5 is provided as an example. Other examples may differ from what is described with respect to FIG. 5.

Figure 6:
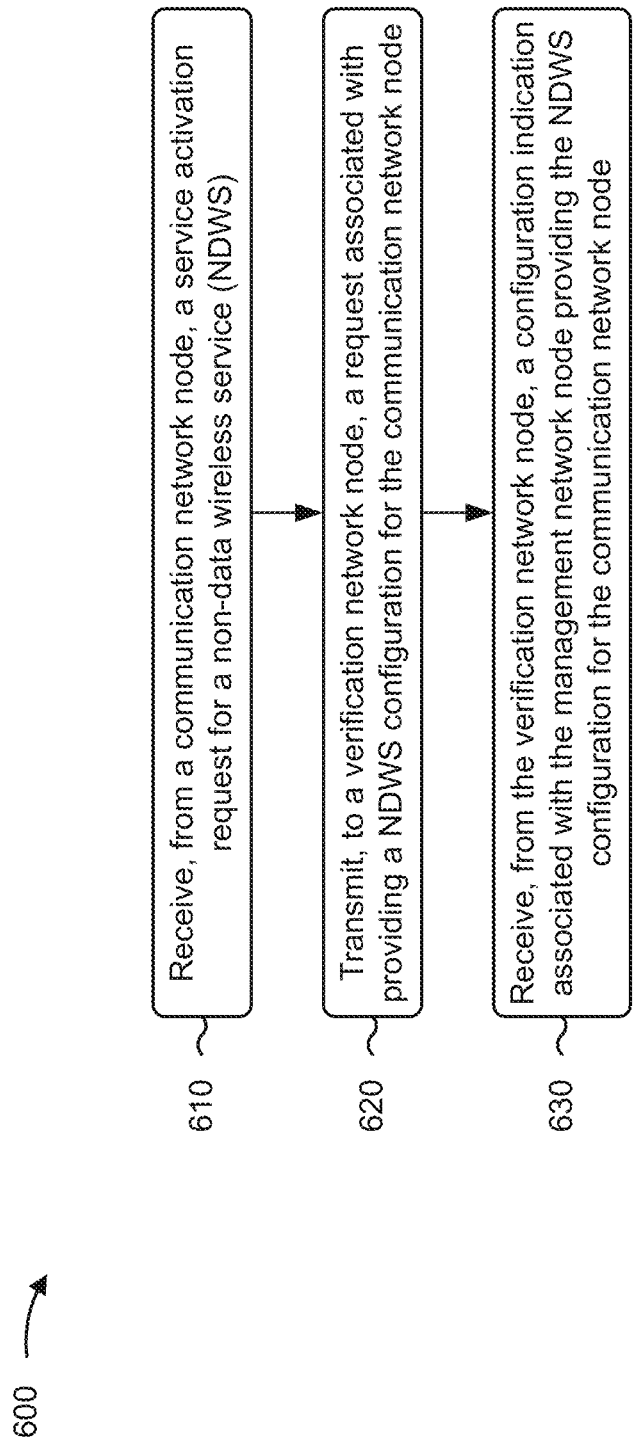
FIG. 6 is a diagram illustrating an example process associated with subscription for an NDWS, in accordance with the present disclosure.

FIG. 6 is a diagram illustrating an example process 600 performed, for example, by a management network node, in accordance with the present disclosure. Example process 600 is an example where the management network node (e.g., management network node 510) performs operations associated with subscription for non-data wireless services.

As shown in FIG. 6, in some aspects, process 600 may include receiving, from a communication network node, a service activation request for an NDWS (block 610). For example, the management network node (e.g., using communication component 860) may receive, from a communication network node, a service activation request for an NDWS, as described above.

As further shown in FIG. 6, in some aspects, process 600 may include transmitting, to a verification network node, a request associated with providing an NDWS configuration for the communication network node (block 620). For example, the management network node (e.g., using communication component 860) may transmit, to a verification network node, a request associated with providing an NDWS configuration for the communication network node, as described above.

As further shown in FIG. 6, in some aspects, process 600 may include receiving, from the verification network node, a configuration indication associated with the management network node providing the NDWS configuration for the communication network node (block 630). For example, the management network node (e.g., using communication component 860) may receive, from the verification network node, a configuration indication associated with the management network node providing the NDWS configuration for the communication network node, as described above.

Process 600 may include additional aspects, such as any single aspect or any combination of aspects described below and/or in connection with one or more other processes described elsewhere herein.

In a first aspect, the NDWS configuration enables the NDWS to be provided without requiring user plane signaling.

In a second aspect, alone or in combination with the first aspect, the NDWS configuration enables the NDWS to be provided using signaling that includes only control plane signaling.

In a third aspect, alone or in combination with one or more of the first and second aspects, the NDWS is a positioning service, a radio frequency sensing service, or a timing synchronization service.

In a fourth aspect, alone or in combination with one or more of the first through third aspects, the management network node is a non-data management function, and the verification network node is a unified data management function.

In a fifth aspect, alone or in combination with one or more of the first through fourth aspects, process 600 includes providing the NDWS configuration to the communication network node.

In a sixth aspect, alone or in combination with one or more of the first through fifth aspects, the NDWS configuration includes a configuration for one or more NDWS reference signals.

In a seventh aspect, alone or in combination with one or more of the first through sixth aspects, the communication network node is a base station.

In an eighth aspect, alone or in combination with one or more of the first through seventh aspects, the service activation request indicates that the base station is configured to provide the NDWS, and one or more cellular data services, for a user equipment.

In a ninth aspect, alone or in combination with one or more of the first through eighth aspects, the service activation request indicates that the base station is configured to provide services that include only the NDWS for a user equipment.

In a tenth aspect, alone or in combination with one or more of the first through ninth aspects, the communication network node is a UE.

In an eleventh aspect, alone or in combination with one or more of the first through tenth aspects, the service activation request indicates that the UE is configured to receive the NDWS, and one or more cellular data services, from a base station.

In a twelfth aspect, alone or in combination with one or more of the first through eleventh aspects, the service activation request indicates that the UE is configured to receive services that include only the NDWS from a base station.

In a thirteenth aspect, alone or in combination with one or more of the first through twelfth aspects, process 600 includes receiving, from the communication network node, a measurement associated with an NDWS reference signal, and processing the measurement associated with the NDWS reference signal.

In a fourteenth aspect, alone or in combination with one or more of the first through thirteenth aspects, the configuration indication indicates that the communication network node is authorized to receive the NDWS, or that the communication network node is authorized to provide the NDWS.

In a fifteenth aspect, alone or in combination with one or more of the first through fourteenth aspects, the configuration indication indicates information associated with providing the NDWS.

In a sixteenth aspect, alone or in combination with one or more of the first through fifteenth aspects, the information includes an area indication that indicates an area where the NDWS can be provided.

In a seventeenth aspect, alone or in combination with one or more of the first through sixteenth aspects, the information includes a consent indication that indicates whether consent is required from the communication network node prior to providing the NDWS configuration for the communication network node.

In an eighteenth aspect, alone or in combination with one or more of the first through seventeenth aspects, process 600 includes providing the NDWS configuration based at least in part on receiving the consent from the communication network node.

Although FIG. 6 shows example blocks of process 600, in some aspects, process 600 may include additional blocks, fewer blocks, different blocks, or differently arranged blocks than those depicted in FIG. 6. Additionally, or alternatively, two or more of the blocks of process 600 may be performed in parallel.

Figure 7:
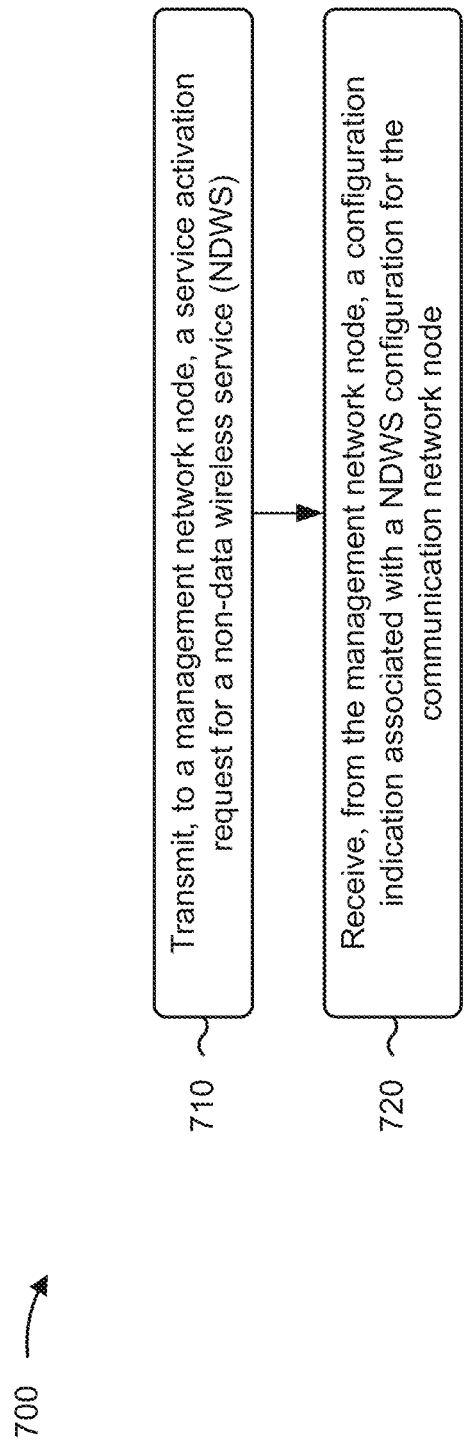
FIG. 7 is a diagram illustrating an example process associated with subscription for an NDWS, in accordance with the present disclosure.

FIG. 7 is a diagram illustrating an example process 700 performed, for example, by a communication network node, in accordance with the present disclosure. Example process 700 is an example where the communication network node (e.g., communication network node 505) performs operations associated with subscription for non-data wireless services.

As shown in FIG. 7, in some aspects, process 700 may include transmitting, to a management network node, a service activation request for an NDWS (block 710). For example, the communication network node (e.g., using communication manager 140 and/or transmission component 904, depicted in FIG. 9) may transmit, to a management network node, a service activation request for an NDWS, as described above.

As further shown in FIG. 7, in some aspects, process 700 may include receiving, from the management network node, a configuration indication associated with an NDWS configuration for the communication network node (block 720). For example, the communication network node (e.g., using communication manager 140 and/or reception component 902, depicted in FIG. 9) may receive, from the management network node, a configuration indication associated with an NDWS configuration for the communication network node, as described above.

Process 700 may include additional aspects, such as any single aspect or any combination of aspects described below and/or in connection with one or more other processes described elsewhere herein.

In a first aspect, process 700 includes providing the NDWS, or receiving the NDWS, without user plane signaling.

In a second aspect, alone or in combination with the first aspect, process 700 includes providing the NDWS, or receiving the NDWS, using signaling that includes only control plane signaling.

In a third aspect, alone or in combination with one or more of the first and second aspects, the NDWS is a positioning service, a radio frequency sensing service, or a timing synchronization service.

In a fourth aspect, alone or in combination with one or more of the first through third aspects, the management network node is a non-data management function.

In a fifth aspect, alone or in combination with one or more of the first through fourth aspects, the communication network node is a base station.

In a sixth aspect, alone or in combination with one or more of the first through fifth aspects, the service activation request indicates that the base station is configured to provide the NDWS, and one or more cellular data services, for a UE.

In a seventh aspect, alone or in combination with one or more of the first through sixth aspects, the service activation request indicates that the base station is configured to provide services that include only the NDWS for a user equipment.

In an eighth aspect, alone or in combination with one or more of the first through seventh aspects, the communication network node is a UE.

In a ninth aspect, alone or in combination with one or more of the first through eighth aspects, the service activation request indicates that the UE is configured to receive the NDWS, and one or more cellular data services, from a base station.

In a tenth aspect, alone or in combination with one or more of the first through ninth aspects, the service activation request indicates that the UE is configured to receive services that include only the NDWS from a base station.

In an eleventh aspect, alone or in combination with one or more of the first through tenth aspects, the configuration indication includes the NDWS configuration.

In a twelfth aspect, alone or in combination with one or more of the first through eleventh aspects, the NDWS configuration includes a configuration for one or more NDWS reference signals.

In a thirteenth aspect, alone or in combination with one or more of the first through twelfth aspects, process 700 includes communicating using one or more NDWS reference signals.

In a fourteenth aspect, alone or in combination with one or more of the first through thirteenth aspects, process 700 includes transmitting, to the management network node, an indication of a measurement associated with an NDWS reference signal.

In a fifteenth aspect, alone or in combination with one or more of the first through fourteenth aspects, the configuration indication indicates information associated with providing the NDWS.

In a sixteenth aspect, alone or in combination with one or more of the first through fifteenth aspects, the information includes an area indication that indicates an area where the NDWS can be provided.

In a seventeenth aspect, alone or in combination with one or more of the first through sixteenth aspects, the configuration indication indicates a request for the communication network node to consent to receiving the NDWS configuration.

Although FIG. 7 shows example blocks of process 700, in some aspects, process 700 may include additional blocks, fewer blocks, different blocks, or differently arranged blocks than those depicted in FIG. 7. Additionally, or alternatively, two or more of the blocks of process 700 may be performed in parallel.

Figure 8:
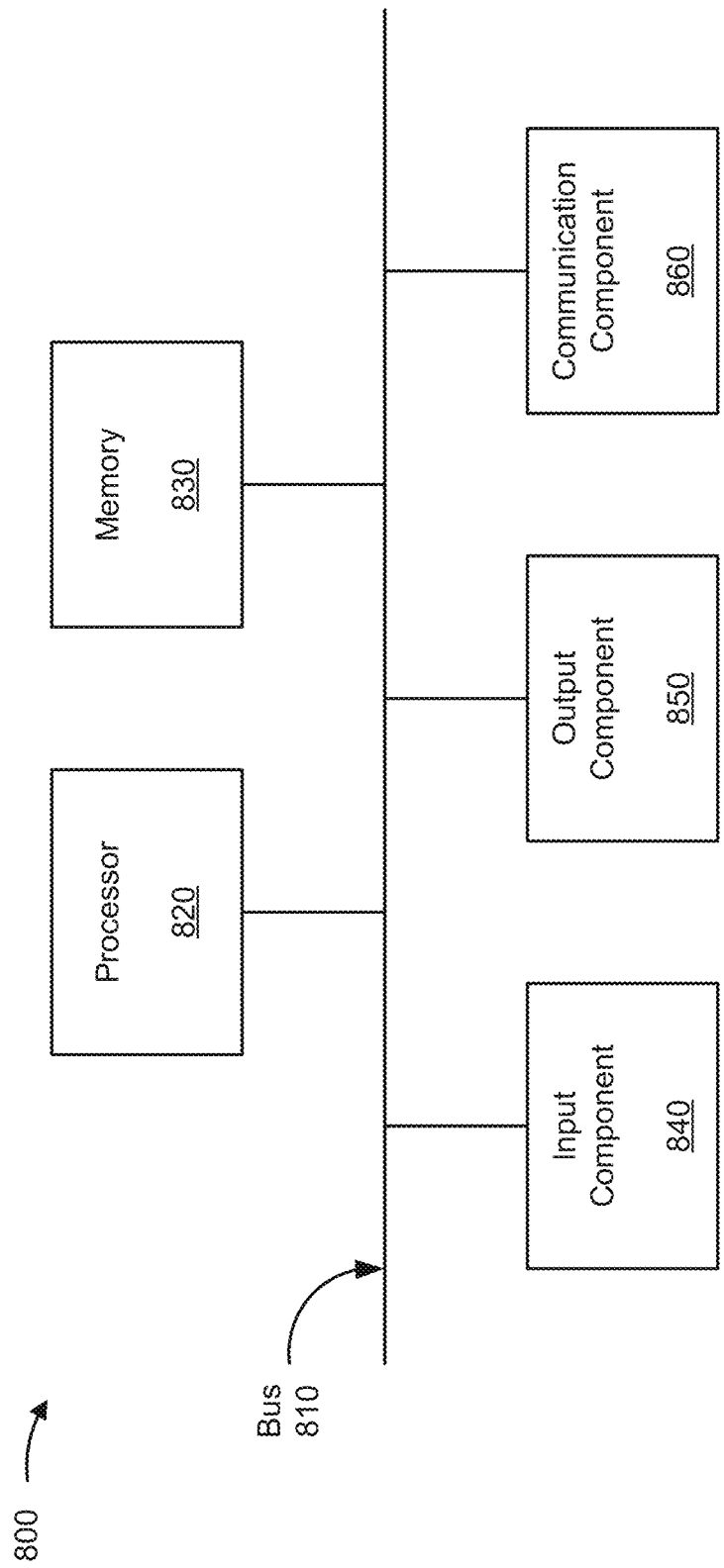
FIG. 8 is a diagram of an example apparatus for wireless communication, in accordance with the present disclosure.

FIG. 8 is a diagram of example components of a device 800, which may correspond to the management network node 510. In some implementations, the management network node 510 may include one or more devices 800 and/or one or more components of device 800. As shown in FIG. 8, device 800 may include a bus 810, a processor 820, a memory 830, an input component 840, an output component 850, and a communication component 860.

Bus 810 includes one or more components that enable wired and/or wireless communication among the components of device 800. Bus 810 may couple together two or more components of FIG. 8, such as via operative coupling, communicative coupling, electronic coupling, and/or electric coupling. Processor 820 includes a central processing unit, a graphics processing unit, a microprocessor, a controller, a microcontroller, a digital signal processor, a field-programmable gate array, an application-specific integrated circuit, and/or another type of processing component. Processor 820 is implemented in hardware, firmware, or a combination of hardware and software. In some implementations, processor 820 includes one or more processors capable of being programmed to perform one or more operations or processes described elsewhere herein.

Memory 830 includes volatile and/or nonvolatile memory. For example, memory 830 may include random access memory (RAM), read only memory (ROM), a hard disk drive, and/or another type of memory (e.g., a flash memory, a magnetic memory, and/or an optical memory). Memory 830 may include internal memory (e.g., RAM, ROM, or a hard disk drive) and/or removable memory (e.g., removable via a universal serial bus connection). Memory 830 may be a non-transitory computer-readable medium. Memory 830 stores information, instructions, and/or software (e.g., one or more software applications) related to the operation of device 800. In some implementations, memory 830 includes one or more memories that are coupled to one or more processors (e.g., processor 820), such as via bus 810.

Input component 840 enables device 800 to receive input, such as user input and/or sensed input. For example, input component 840 may include a touch screen, a keyboard, a keypad, a mouse, a button, a microphone, a switch, a sensor, a global positioning system sensor, an accelerometer, a gyroscope, and/or an actuator. Output component 850 enables device 800 to provide output, such as via a display, a speaker, and/or a light-emitting diode. Communication component 860 enables device 800 to communicate with other devices via a wired connection and/or a wireless connection. For example, communication component 860 may include a receiver, a transmitter, a transceiver, a modem, a network interface card, and/or an antenna.

Device 800 may perform one or more operations or processes described herein. For example, a non-transitory computer-readable medium (e.g., memory 830) may store a set of instructions (e.g., one or more instructions or code) for execution by processor 820. Processor 820 may execute the set of instructions to perform one or more operations or processes described herein. In some implementations, execution of the set of instructions, by one or more processors 820, causes the one or more processors 820 and/or the device 800 to perform one or more operations or processes described herein. In some implementations, hardwired circuitry is used instead of or in combination with the instructions to perform one or more operations or processes described herein. Additionally, or alternatively, processor 820 may be configured to perform one or more operations or processes described herein. Thus, implementations described herein are not limited to any specific combination of hardware circuitry and software.

In some aspects, the device 800 may be configured to perform one or more of the steps of the process 600, such as one or more of the steps described above in connection with FIG. 6.

The number and arrangement of components shown in FIG. 8 are provided as an example. Device 800 may include additional components, fewer components, different components, or differently arranged components than those shown in FIG. 8. Additionally, or alternatively, a set of components (e.g., one or more components) of device 800 may perform one or more functions described as being performed by another set of components of device 800.

Figure 9:
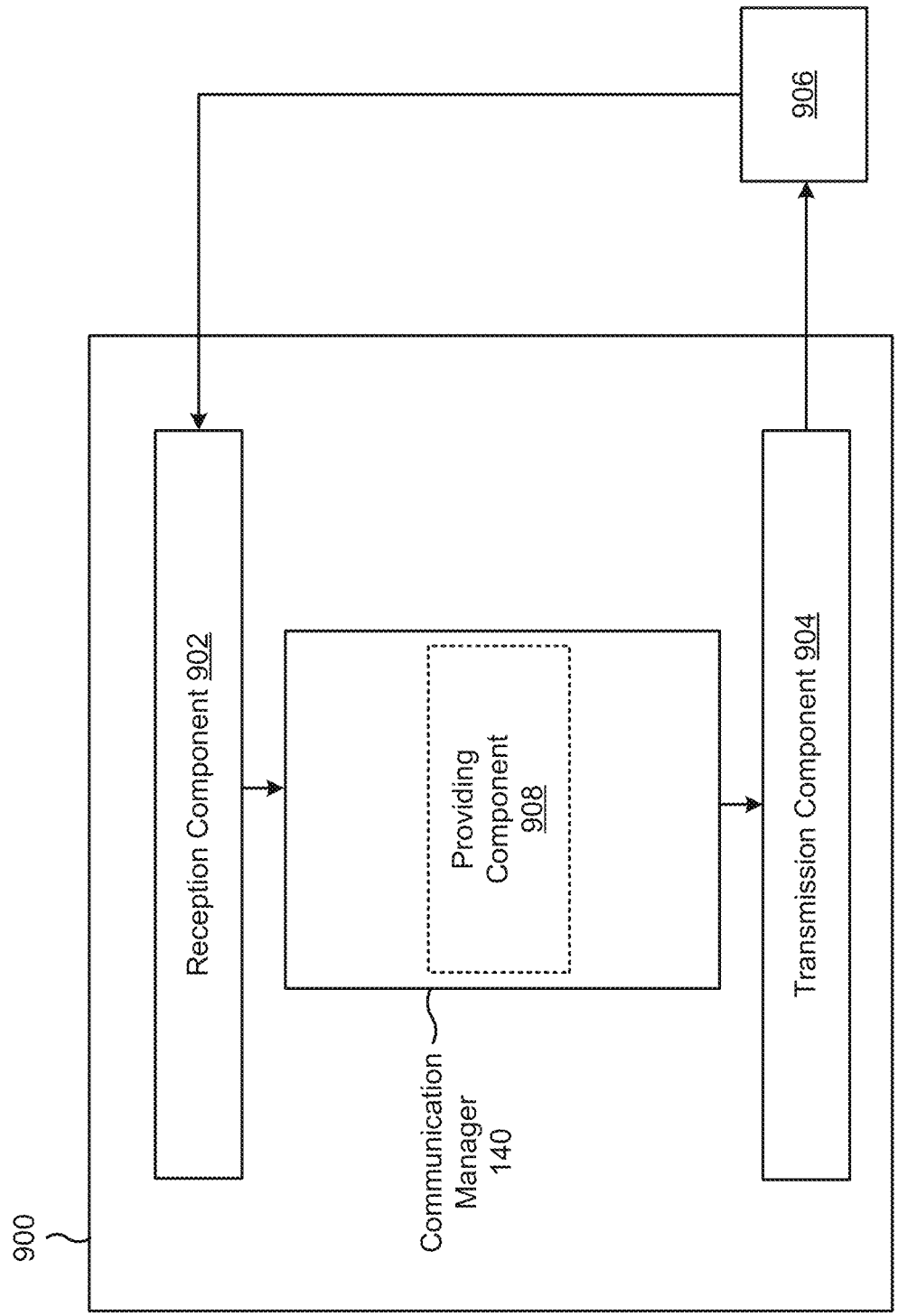
FIG. 9 is a diagram of an example apparatus for wireless communication, in accordance with the present disclosure.

FIG. 9 is a diagram of an example apparatus 900 for wireless communication. The apparatus 900 may be a communication network node, or a communication network node may include the apparatus 900. In some aspects, the apparatus 900 includes a reception component 902 and a transmission component 904, which may be in communication with one another (for example, via one or more buses and/or one or more other components). As shown, the apparatus 900 may communicate with another apparatus 906 (such as a UE, a base station, or another wireless communication device) using the reception component 902 and the transmission component 904. As further shown, the apparatus 900 may include the communication manager 140. The communication manager 140 may include a providing component 908, among other examples.

In some aspects, the apparatus 900 may be configured to perform one or more operations described herein in connection with FIG. 5. Additionally, or alternatively, the apparatus 900 may be configured to perform one or more processes described herein, such as process 700 of FIG. 7. In some aspects, the apparatus 900 and/or one or more components shown in FIG. 9 may include one or more components of the communication network node described in connection with FIG. 2. Additionally, or alternatively, one or more components shown in FIG. 9 may be implemented within one or more components described in connection with FIG. 2. Additionally, or alternatively, one or more components of the set of components may be implemented at least in part as software stored in a memory. For example, a component (or a portion of a component) may be implemented as instructions or code stored in a non-transitory computer-readable medium and executable by a controller or a processor to perform the functions or operations of the component.

The reception component 902 may receive communications, such as reference signals, control information, data communications, or a combination thereof, from the apparatus 906. The reception component 902 may provide received communications to one or more other components of the apparatus 900. In some aspects, the reception component 902 may perform signal processing on the received communications (such as filtering, amplification, demodulation, analog-to-digital conversion, demultiplexing, deinterleaving, de-mapping, equalization, interference cancellation, or decoding, among other examples), and may provide the processed signals to the one or more other components of the apparatus 900. In some aspects, the reception component 902 may include one or more antennas, a modem, a demodulator, a MIMO detector, a receive processor, a controller/processor, a memory, or a combination thereof, of the communication network node described in connection with FIG. 2.

The transmission component 904 may transmit communications, such as reference signals, control information, data communications, or a combination thereof, to the apparatus 906. In some aspects, one or more other components of the apparatus 900 may generate communications and may provide the generated communications to the transmission component 904 for transmission to the apparatus 906. In some aspects, the transmission component 904 may perform signal processing on the generated communications (such as filtering, amplification, modulation, digital-to-analog conversion, multiplexing, interleaving, mapping, or encoding, among other examples), and may transmit the processed signals to the apparatus 906. In some aspects, the transmission component 904 may include one or more antennas, a modem, a modulator, a transmit MIMO processor, a transmit processor, a controller/processor, a memory, or a combination thereof, of the communication network node described in connection with FIG. 2. In some aspects, the transmission component 904 may be co-located with the reception component 902 in a transceiver.

The reception component 902 may receive, from a communication network node, a service activation request for an NDWS. The transmission component 904 may transmit, to a verification network node, a request associated with providing an NDWS configuration for the communication network node. The reception component 902 may receive, from the verification network node, a configuration indication associated with the management network node providing the NDWS configuration for the communication network node.

The transmission component 904 may transmit, to a management network node, a service activation request for an NDWS. The reception component 902 may receive, from the management network node, a configuration indication associated with an NDWS configuration for the communication network node.

The providing component 908 may provide the NDWS, or receiving the NDWS, without user plane signaling.

The providing component 908 may provide the NDWS, or receiving the NDWS, using signaling that includes only control plane signaling.

The reception component 902 and/or the transmission component 904 may communicate using one or more NDWS reference signals.

The transmission component 904 may transmit, to the management network node, an indication of a measurement associated with an NDWS reference signal.

The number and arrangement of components shown in FIG. 9 are provided as an example. In practice, there may be additional components, fewer components, different components, or differently arranged components than those shown in FIG. 9. Furthermore, two or more components shown in FIG. 9 may be implemented within a single component, or a single component shown in FIG. 9 may be implemented as multiple, distributed components. Additionally, or alternatively, a set of (one or more) components shown in FIG. 9 may perform one or more functions described as being performed by another set of components shown in FIG. 9.

The following provides an overview of some Aspects of the present disclosure:

Aspect 1: A method of wireless communication performed by a management network node, comprising: receiving, from a communication network node, a service activation request for a non-data wireless service (NDWS); transmitting, to a verification network node, a request associated with providing an NDWS configuration for the communication network node; and receiving, from the verification network node, a configuration indication associated with the management network node providing the NDWS configuration for the communication network node.

Aspect 2: The method of Aspect 1, wherein the NDWS configuration enables the NDWS to be provided without requiring user plane signaling.

Aspect 3: The method of any of Aspects 1-2, wherein the NDWS configuration enables the NDWS to be provided using signaling that includes only control plane signaling.

Aspect 4: The method of any of Aspects 1-3, wherein the NDWS is a positioning service, a radio frequency sensing service, or a timing synchronization service.

Aspect 5: The method of any of Aspects 1-4, wherein the management network node is a non-data management function, and the verification network node is a unified data management function.

Aspect 6: The method of any of Aspects 1-5, further comprising providing the NDWS configuration to the communication network node.

Aspect 7: The method of Aspect 6, wherein the NDWS configuration includes a configuration for one or more NDWS reference signals.

Aspect 8: The method of any of Aspects 1-7, wherein the communication network node is a base station.

Aspect 9: The method of Aspect 8, wherein the service activation request indicates that the base station is configured to provide the NDWS, and one or more cellular data services, for a user equipment.

Aspect 10: The method of Aspect 8, wherein the service activation request indicates that the base station is configured to provide services that include only the NDWS for a user equipment.

Aspect 11: The method of any of Aspects 1-10, wherein the communication network node is a user equipment (UE).

Aspect 12: The method of Aspect 11, wherein the service activation request indicates that the UE is configured to receive the NDWS, and one or more cellular data services, from a base station.

Aspect 13: The method of Aspect 11, wherein the service activation request indicates that the UE is configured to receive services that include only the NDWS from a base station.

Aspect 14: The method of any of Aspects 1-13, further comprising: receiving, from the communication network node, a measurement associated with an NDWS reference signal; and processing the measurement associated with the NDWS reference signal.

Aspect 15: The method of any of Aspects 1-14, wherein the configuration indication indicates that the communication network node is authorized to receive the NDWS, or that the communication network node is authorized to provide the NDWS.

Aspect 16: The method of any of Aspects 1-15, wherein the configuration indication indicates information associated with providing the NDWS.

Aspect 17: The method of Aspect 16, wherein the information includes an area indication that indicates an area where the NDWS can be provided.

Aspect 18: The method of Aspect 16, wherein the information includes a consent indication that indicates whether consent is required from the communication network node prior to providing the NDWS configuration for the communication network node.

Aspect 19: The method of Aspect 18, further comprising providing the NDWS configuration based at least in part on receiving the consent from the communication network node.

Aspect 20: A method of wireless communication performed by a communication network node, comprising: transmitting, to a management network node, a service activation request for a non-data wireless service (NDWS); and receiving, from the management network node, a configuration indication associated with an NDWS configuration for the communication network node.

Aspect 21: The method of Aspect 20, further comprising providing the NDWS, or receiving the NDWS, without user plane signaling.

Aspect 22: The method of any of Aspects 20-21, further comprising providing the NDWS, or receiving the NDWS, using signaling that includes only control plane signaling.

Aspect 23: The method of any of Aspects 20-22, wherein the NDWS is a positioning service, a radio frequency sensing service, or a timing synchronization service.

Aspect 24: The method of any of Aspects 20-23, wherein the management network node is a non-data management function.

Aspect 25: The method of any of Aspects 20-24, wherein the communication network node is a base station.

Aspect 26: The method of Aspect 25, wherein the service activation request indicates that the base station is configured to provide the NDWS, and one or more cellular data services, for a user equipment.

Aspect 27: The method of Aspect 25, wherein the service activation request indicates that the base station is configured to provide services that include only the NDWS for a user equipment.

Aspect 28: The method of any of Aspects 20-27, wherein the communication network node is a user equipment (UE).

Aspect 29: The method of Aspect 28, wherein the service activation request indicates that the UE is configured to receive the NDWS, and one or more cellular data services, from a base station.

Aspect 30: The method of Aspect 28, wherein the service activation request indicates that the UE is configured to receive services that include only the NDWS from a base station.

Aspect 31: The method of any of Aspects 20-30, wherein the configuration indication includes the NDWS configuration.

Aspect 32: The method of Aspect 31, wherein the NDWS configuration includes a configuration for one or more NDWS reference signals.

Aspect 33: The method of any of Aspects 20-32, further comprising communicating using one or more NDWS reference signals.

Aspect 34: The method of any of Aspects 20-33, further comprising transmitting, to the management network node, an indication of a measurement associated with an NDWS reference signal.

Aspect 35: The method of any of Aspects 20-34, wherein the configuration indication indicates information associated with providing the NDWS.

Aspect 36: The method of Aspect 35, wherein the information includes an area indication that indicates an area where the NDWS can be provided.

Aspect 37: The method of any of Aspects 20-36, wherein the configuration indication indicates a request for the communication network node to consent to receiving the NDWS configuration.

Aspect 38: An apparatus for wireless communication at a device, comprising a processor; memory coupled with the processor; and instructions stored in the memory and executable by the processor to cause the apparatus to perform the method of one or more of Aspects 1-19.

Aspect 39: A device for wireless communication, comprising a memory and one or more processors coupled to the memory, the one or more processors configured to perform the method of one or more of Aspects 1-19.

Aspect 40: An apparatus for wireless communication, comprising at least one means for performing the method of one or more of Aspects 1-19.

Aspect 41: A non-transitory computer-readable medium storing code for wireless communication, the code comprising instructions executable by a processor to perform the method of one or more of Aspects 1-19.

Aspect 42: A non-transitory computer-readable medium storing a set of instructions for wireless communication, the set of instructions comprising one or more instructions that, when executed by one or more processors of a device, cause the device to perform the method of one or more of Aspects 1-19.

Aspect 43: An apparatus for wireless communication at a device, comprising a processor; memory coupled with the processor; and instructions stored in the memory and executable by the processor to cause the apparatus to perform the method of one or more of Aspects 1-20.

Aspect 44: A device for wireless communication, comprising a memory and one or more processors coupled to the memory, the one or more processors configured to perform the method of one or more of Aspects 1-20.

Aspect 45: An apparatus for wireless communication, comprising at least one means for performing the method of one or more of Aspects 1-20.

Aspect 46: A non-transitory computer-readable medium storing code for wireless communication, the code comprising instructions executable by a processor to perform the method of one or more of Aspects 1-20.

Aspect 47: A non-transitory computer-readable medium storing a set of instructions for wireless communication, the set of instructions comprising one or more instructions that, when executed by one or more processors of a device, cause the device to perform the method of one or more of Aspects 1-20.

The foregoing disclosure provides illustration and description but is not intended to be exhaustive or to limit the aspects to the precise forms disclosed. Modifications and variations may be made in light of the above disclosure or may be acquired from practice of the aspects.

As used herein, the term "component" is intended to be broadly construed as hardware and/or a combination of hardware and software. "Software" shall be construed broadly to mean instructions, instruction sets, code, code segments, program code, programs, subprograms, software modules, applications, software applications, software packages, routines, subroutines, objects, executables, threads of execution, procedures, and/or functions, among other examples, whether referred to as software, firmware, middleware, microcode, hardware description language, or otherwise. As used herein, a "processor" is implemented in hardware and/or a combination of hardware and software. It will be apparent that systems and/or methods described herein may be implemented in different forms of hardware and/or a combination of hardware and software. The actual specialized control hardware or software code used to implement these systems and/or methods is not limiting of the aspects. Thus, the operation and behavior of the systems and/or methods are described herein without reference to specific software code, since those skilled in the art will understand that software and hardware can be designed to implement the systems and/or methods based, at least in part, on the description herein.

As used herein, "satisfying a threshold" may, depending on the context, refer to a value being greater than the threshold, greater than or equal to the threshold, less than the threshold, less than or equal to the threshold, equal to the threshold, not equal to the threshold, or the like.

Even though particular combinations of features are recited in the claims and/or disclosed in the specification, these combinations are not intended to limit the disclosure of various aspects. Many of these features may be combined in ways not specifically recited in the claims and/or disclosed in the specification. The disclosure of various aspects includes each dependent claim in combination with every other claim in the claim set. As used herein, a phrase referring to "at least one of" a list of items refers to any combination of those items, including single members. As an example, "at least one of: a, b, or c" is intended to cover a, b, c, a+b, a+c, b+c, and a+b+c, as well as any combination with multiples of the same element (e.g., a+a, a+a+a, a+a+b, a+a+c, a+b+b, a+c+c, b+b, b+b+b, b+b+c, c+c, and c+c+c, or any other ordering of a, b, and c).

No element, act, or instruction used herein should be construed as critical or essential unless explicitly described as such. Also, as used herein, the articles "a" and "an" are intended to include one or more items and may be used interchangeably with "one or more." Further, as used herein, the article "the" is intended to include one or more items referenced in connection with the article "the" and may be used interchangeably with "the one or more." Furthermore, as used herein, the terms "set" and "group" are intended to include one or more items and may be used interchangeably with "one or more." Where only one item is intended, the phrase "only one" or similar language is used. Also, as used herein, the terms "has," "have," "having," or the like are intended to be open-ended terms that do not limit an element that they modify (e.g., an element "having" A may also have B). Further, the phrase "based on" is intended to mean "based, at least in part, on" unless explicitly stated otherwise. Also, as used herein, the term "or" is intended to be inclusive when used in a series and may be used interchangeably with "and/or," unless explicitly stated otherwise (e.g., if used in combination with "either" or "only one of").

What is claimed is:

1. An apparatus for wireless communication at a management network node, comprising:
   one or more memories; and
   one or more processors, coupled to the one or more memories, configured to:
      receive, from a communication network node, a service activation request for a radio frequency sensing service;
      transmit, to a verification network node, a request associated with providing a configuration, for the communication network node, that enables the communication network node to provide or receive the radio frequency sensing service without establishing a data session; and
      receive, from the verification network node, a configuration indication associated with the management network node providing the configuration for the communication network node.

2. The apparatus of claim 1, wherein the configuration enables the radio frequency sensing service to be provided without requiring user plane signaling.

3. The apparatus of claim 1, wherein the configuration enables the radio frequency sensing service to be provided using signaling that includes only control plane signaling.

4. The apparatus of claim 1, wherein the one or more processors are further configured to:
   receive a service activation request for a positioning service or a timing synchronization service.

5. The apparatus of claim 1, wherein the one or more processors are further configured to provide the configuration to the communication network node.

6. The apparatus of claim 5, wherein the configuration includes a configuration for one or more non-data reference signals.

7. The apparatus of claim 1, wherein the communication network node is a base station or a user equipment.

8. The apparatus of claim 1, wherein the configuration indication indicates that the communication network node is authorized to receive the radio frequency sensing service, or that the communication network node is authorized to provide the radio frequency sensing service.

9. The apparatus of claim 1, wherein the configuration indication indicates information associated with providing the radio frequency sensing service.

10. The apparatus of claim 9, wherein the information includes an area indication that indicates an area where the radio frequency sensing service can be provided.

11. The apparatus of claim 9, wherein the information includes a consent indication that indicates whether consent is required from the communication network node prior to providing the configuration for the communication network node.

12. An apparatus for wireless communication at a communication network node, comprising:
   one or more memories; and
   one or more processors, coupled to the one or more memories, configured to:
      transmit, to a management network node, a service activation request for a radio frequency sensing service; and
      receive, from the management network node, a configuration indication associated with a configuration, for the communication network node, that enables the communication network node to provide or receive the radio frequency sensing service without establishing a data session.

13. The apparatus of claim 12, wherein the one or more processors are further configured to provide the radio frequency sensing service, or receive the radio frequency sensing service, without requiring user plane signaling.

14. The apparatus of claim 12, wherein the one or more processors are further configured to provide the radio frequency sensing service, or receive the radio frequency sensing service, using signaling that includes only control plane signaling.

15. The apparatus of claim 12, wherein the one or more processors are further configured to:
   transmit a service activation request for a positioning service or a timing synchronization service.

16. The apparatus of claim 12, wherein the communication network node is a base station or a user equipment.

17. The apparatus of claim 12, wherein the configuration indication includes the configuration.

18. The apparatus of claim 17, wherein the configuration includes a configuration for one or more non-data reference signals.

19. The apparatus of claim 12, wherein the one or more processors are further configured to communicate using one or more non-data reference signals.

20. The apparatus of claim 12, wherein the configuration indication indicates information associated with providing the radio frequency sensing service.

21. The apparatus of claim 20, wherein the information includes an area indication that indicates an area where the radio frequency sensing service can be provided.

22. The apparatus of claim 12, wherein the configuration indication indicates a request for the communication network node to consent to receiving the configuration.

23. A method of wireless communication performed by a management network node, comprising:
receiving, from a communication network node, a service activation request for a radio frequency sensing service;
transmitting, to a verification network node, a request associated with providing a configuration, for the communication network node, that enables the communication network node to provide or receive the radio frequency sensing service without establishing a data session; and
receiving, from the verification network node, a configuration indication associated with the management network node providing the configuration for the communication network node.

24. The method of claim 23, wherein the configuration enables the radio frequency sensing service to be provided without requiring user plane signaling.

25. The method of claim 23, wherein the configuration enables the radio frequency sensing service to be provided using signaling that includes only control plane signaling.

26. The method of claim 23, further comprising:
receiving a service activation request for a positioning service or a timing synchronization service.

27. A method of wireless communication performed by a communication network node, comprising:
transmitting, to a management network node, a service activation request for a radio frequency sensing service; and
receiving, from the management network node, a configuration indication associated with a configuration, for the communication network node, that enables the communication network node to provide or receive the radio frequency sensing service without establishing a data session.

28. The method of claim 27, further comprising providing the radio frequency sensing service, or receiving the radio frequency sensing service, without requiring user plane signaling.

29. The method of claim 27, further comprising providing the radio frequency sensing service, or receiving the radio frequency sensing service, using signaling that includes only control plane signaling.

30. The method of claim 27, further comprising:
transmitting a service activation request for a positioning service or a timing synchronization service.

\* \* \* \* \*